(12) United States Patent
Ono

(10) Patent No.: US 7,570,281 B1
(45) Date of Patent: Aug. 4, 2009

(54) IMAGE PROCESSING APPARATUS AND METHOD FOR DETECTING A MAIN SUBJECT TO BE PHOTOGRAPHED

(75) Inventor: Shuji Ono, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 833 days.

(21) Appl. No.: 09/712,925

(22) Filed: Nov. 16, 2000

(30) Foreign Application Priority Data

| Nov. 16, 1999 | (JP) | ................................. 11-326183 |
| Feb. 16, 2000 | (JP) | ............................ 2000-037771 |
| Sep. 26, 2000 | (JP) | ............................ 2000-291623 |

(51) Int. Cl.
H04N 7/18 (2006.01)
H04N 5/238 (2006.01)

(52) U.S. Cl. .................................. 348/135; 348/222.1

(58) Field of Classification Search ................. 348/135, 348/139, 140, 169, 170, 171, 172, 208.14; 382/103, 106, 107, 117, 118, 154
See application file for complete search history.

(56) References Cited

U.S. PATENT DOCUMENTS

| 5,835,641 A | * | 11/1998 | Sotoda et al. ................ 382/291 |
| 5,852,669 A | * | 12/1998 | Eleftheriadis et al. ....... 382/118 |
| 5,912,980 A | * | 6/1999 | Hunke ......................... 382/103 |
| 6,507,366 B1 | * | 1/2003 | Lee .............................. 348/352 |
| 6,526,161 B1 | * | 2/2003 | Yan .............................. 382/118 |
| 6,714,665 B1 | * | 3/2004 | Hanna et al. ................. 382/117 |
| 6,734,911 B1 | * | 5/2004 | Lyons ......................... 348/340 |
| 6,792,135 B1 | * | 9/2004 | Toyama ...................... 382/118 |
| 7,106,376 B1 | * | 9/2006 | Anderson .................... 348/345 |

FOREIGN PATENT DOCUMENTS

| EP | 0 908 846 A2 | 4/1999 |
| JP | 59-135304 | 8/1984 |
| JP | 3-120491 | 5/1991 |
| JP | 50-11454 | 1/1993 |
| JP | 11-219421 A | 8/1999 |
| WO | WO-99/06940 A1 | 2/1999 |

OTHER PUBLICATIONS

Murino et al., Visual Surveillance by Depth from Focus Industrial Electronics, Control and Instrumentation, 20th International Conference, vol. 2, 1994, pp. 998-1003.

* cited by examiner

*Primary Examiner*—Justin P Misleh
(74) *Attorney, Agent, or Firm*—Birch, Stewart, Kolasch & Birch, LLP

(57) ABSTRACT

An image processing apparatus of the present invention comprises an image capturing unit for obtaining image data, an image capturing control unit for controlling such as a zoom, a processing unit for detecting a main subject from image data, a display unit for displaying an image, and an operating unit for a user to operate.

28 Claims, 15 Drawing Sheets

IMAGE PROCESSING APPARATUS AND METHOD FOR DETECTING A MAIN SUBJECT TO BE PHOTOGRAPHED

The present patent application claims priority from Japanese patent applications Nos. H11-326183 filed on Nov. 16, 1999, 2000-37771 filed on Feb. 16, 2000, and 2000-291623 filed on Sep. 26, 2000, the contents of which are incorporated herein by reference.

BACKGROUND OF THE INVENTION

1. Field of the Invention

The present invention relates to an image processing apparatus. More particularly, the present invention relates to an image processing apparatus for detecting a main subject from image data.

2. Description of the Related Art

There has been conventionally known various kinds of arts for photographing desired pictures which find a main subject from the other subjects, adjust the timing of a photograph based on the condition of the main subject and select an appropriate image from a plurality of photographed images.

The general method of finding a main subject from the other subjects is to detect a main subject through finding a distinctive feature as a main subject in an image. In a case to detect a person from an image, for example, eyes or a mouth are recognized as distinctive feature.

However, it takes much time to find a main subject through all the areas of an image. Even if it is the case to find eyes or a mouth, there may be sometimes a case that the other subjects have similar brightness to that of the eyes or the mouth to be detected. In this case, it may be possible that a camera misidentifies as a main subject. In particular, there is a high likelihood to misidentify objects if those objects are seen in a row, even if the objects actually stand at different distances from one another.

SUMMARY OF THE INVENTION

Therefore, it is an object of the present invention to provide an image processing apparatus, an image processing method and recording medium, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, an image processing apparatus includes: an image data input unit for inputting image data of an object; a range setting unit for setting a partial searching range, which defines a partial depth length in the image data; and a partial image extracting unit for extracting from the image data, the certain part of the object included in the partial searching range as a partial image.

The image data input unit may include a means for inputting a parallactic image, which picks up an image of the object from a plurality of different perspectives. The image processing apparatus may further include a depth distribution information receiving unit for receiving the depth distribution information based on the parallactic image.

The image processing apparatus may further include a main subject detecting unit for detecting a main subject from the partial image and receiving or acquiring main subject information.

The main subject detecting unit may include a distinctive parts detecting unit for detecting from the partial image, a distinctive part, which should be included in the main subject; and an information receiving unit for receiving the main subject information based on the position of the distinctive part detected by the distinctive parts detecting unit.

The range setting unit may include a means for setting a first partial searching range and a means for setting a second partial searching range, which differs from the first partial searching range. The partial image extracting unit includes a means for extracting the part of the object included in the first partial searching range as a partial image and a means for extracting the part of the object included in the second partial searching range as a second partial image. Further, the main subject detecting unit includes a means for detecting the main subject from the first partial image and a means for detecting the main subject from the second partial image when the main subject is not detected from the first partial image.

The range setting unit may set a predetermined depth length as the first partial searching range and sets the depth length contiguous to the first partial searching range as the second partial searching range.

The range setting unit sets the depth length, which includes an independent object existing at the nearest distance, as the first partial searching range based on the depth distribution information and sets the depth length contiguous to the first partial searching range as the second partial searching range.

The range setting unit may divide the depth range that includes the object in the image data based on the depth distribution information and sets a plurality of the partial searching ranges. The partial image extracting unit may extract from the image data, the part of the object included in each of a plurality of the partial searching ranges as a plurality of the partial image. In addition, the main subject detecting unit may detect the main subject from each of a plurality of the partial image and receives a plurality of the main subject information.

The range setting unit may set a different the partial searching range when the main subject is not detected in the partial searching range set by the range setting unit. The partial image extracting unit may extract again the partial image. The main subject detecting unit may detect again the main subject.

The image data input unit may be an image capturing unit for picking up an image of the object. The image processing apparatus may include a photographic condition deciding unit for deciding a photographic condition based on the main subject information, and an image capturing control unit for controlling imaging by the image capturing unit based on the photographic condition.

The image processing apparatus may further include a processing condition deciding unit for deciding an image processing condition based on the main subject information and an image processor for processing the image data based on the image processing condition.

The image processing apparatus may further include an output condition deciding unit for deciding an image outputting condition based on the main subject information and an image data output unit for outputting the image data based on the image outputting condition.

The image processing apparatus may further include a selecting condition storing unit for storing a predetermined selecting condition of which the main subject should satisfy, and an image selecting unit for selecting from a plurality of the image data input by the image data input unit, a desired image data, which includes a desired main subject satisfying the selecting condition.

The image data input unit is an image capturing unit, which captures an image of the object based on a photographic timing signal. The image processing apparatus may include a timing condition storing unit for storing a predetermined photographic timing condition relating to the main subject, and a timing signal output unit for outputting the photographic timing signal to the image capturing unit when the main subject satisfies the photographic timing condition.

An image processing method according to the present invention includes: inputting image data of an object; setting a partial searching range, which defines a partial depth length for searching a main subject in the image data; extracting from the image data, the part of an object included in the partial searching range as a partial image, based on a depth distribution information showing the distance between a camera and each part of the object included in the image data; detecting the main subject in the partial image; and receiving a predetermined main subject information relating to the detected main subject.

The setting is a first setting of a first partial searching range as the partial searching range, the extracting is a first extracting of the part of the object included in the first partial searching range, as a first partial image, and the detecting is a first detecting of the main subject in the first partial image. The image processing method may include a second setting of a second partial searching range as the partial searching range when the main subject is not detected in the first partial image, a second extracting of the part of the object included in the second partial searching range as a second partial image, and a second detecting of the main subject in the second partial image.

The first setting is a setting of the depth length that includes an independent object existing at the nearest distance as the first partial searching range based on the depth distribution information, while the second setting is a setting of the depth length contiguous to the first partial searching range, as the second partial searching range.

The setting is a dividing the depth range that includes the object in the image data based on the depth distribution information and a setting of a plurality of the partial searching range. The extracting is a extracting from the image data, of the part of the object included in each of a plurality of the partial searching range as a plurality of the partial image. The detecting is a detecting of the main subject from each of a plurality of the partial image. Further, the receiving is a receiving of the main subject information relating to each of a plurality of the detected partial searching range.

The inputting is an inputting at an image capturing unit, which captures an image of the object. The image processing method may include deciding a photographic condition based on the main subject information, and controlling an image capturing at the image capturing unit based on the photographic condition.

The image processing method may further include deciding an image processing condition based on the main subject information, and processing the image data based on the image processing condition.

The image processing method may further include deciding an image outputting condition based on the main subject information and outputting the image data based on the image outputting condition.

The image processing method may further include storing a predetermined selecting condition relating to the main subject, and selecting from a plurality of the image data input at the inputting, a desired image data that includes a desired main subject satisfying the selecting condition.

The inputting is a capturing of an image of the object based on a photographic timing signal. The image processing method may further include storing a predetermined photographic timing condition relating to the main subject, and outputting the photographic timing signal to the image capturing unit when the main subject satisfies the photographic timing condition.

A recording medium, which records a program for processing an image and can be read by a computer, includes: a module for inputting image data of an object; a module for setting a partial searching range, which defines the partial depth length for searching a main subject in the image data; a module for extracting from the image data, the part of the object included in the partial searching range as a partial image, based on depth distribution information showing the distance between a camera and the object included in the image data; a module for detecting the main subject from the partial image; and a module for receiving predetermined main subject information relating to detected main subject.

This summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

DETAILED DESCRIPTION OF THE INVENTION

The invention will now be described based on the preferred embodiments, which do not intend to limit the range of the present invention, but exemplify the invention. All of the features and the combinations thereof described in the embodiment are not necessarily essential to the invention.

The image processing apparatus of the present invention described in the following can be achieved as a digital camera or a laboratory system, for example, in each of the following embodiments. A digital still camera or a digital video camera, for example, are included in the digital camera.

The first embodiment of the present invention will be described in the following. The image processing apparatus according to the present embodiment is a digital camera, which detects a main subject and takes a photograph under the best photographing condition. A main subject here means an independent object, which is intentionally photographed amongst the photographing objects. For example, a main subject will be something such as a person who is photographed in a room, fish that is photographed swimming in an aquarium, or a bird that is photographed perching on a branch of a tree.

Figure 1:
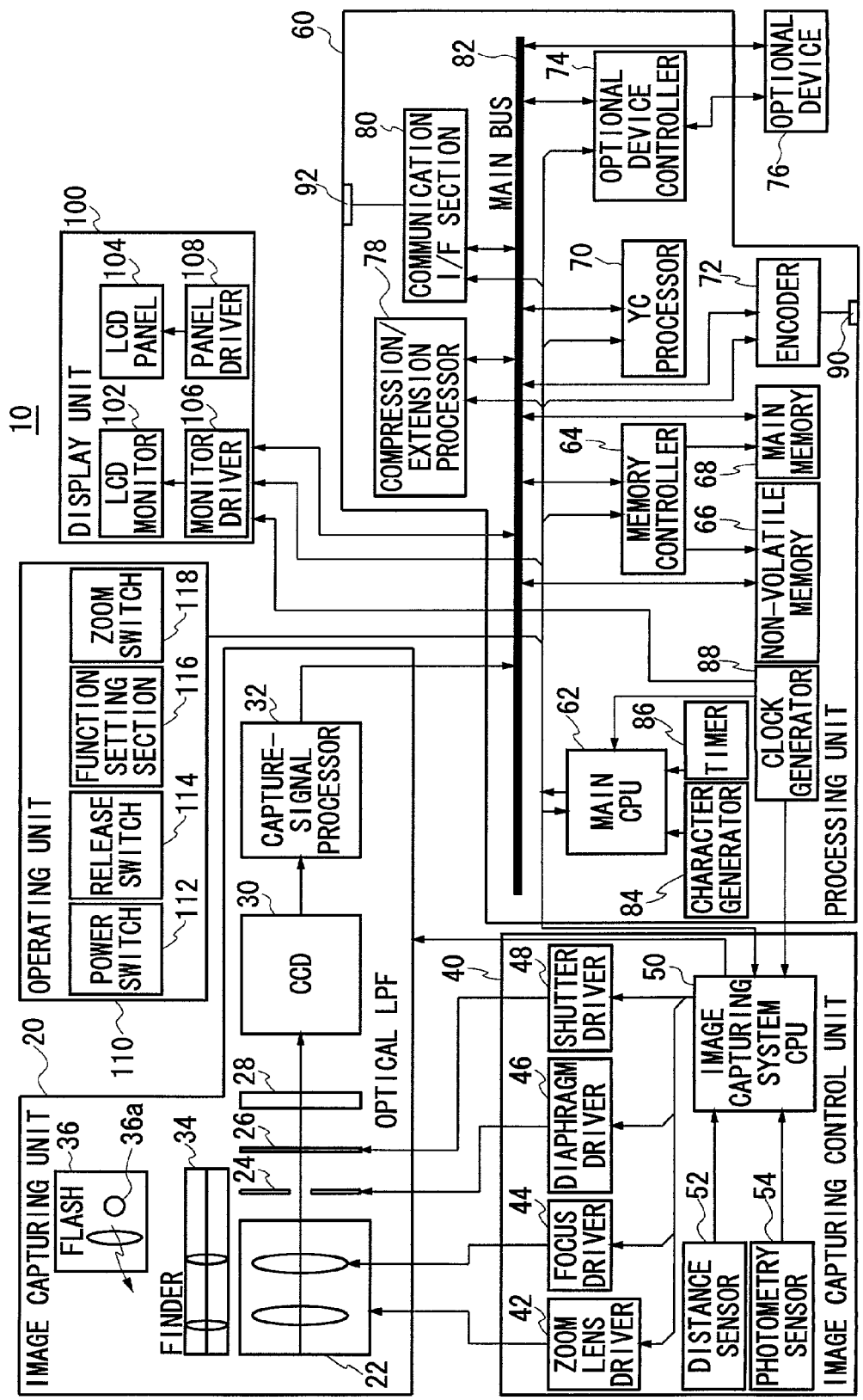
FIG. 1 shows a structural view of a digital camera.

FIG. 1 is a block diagram depicting a structure of a digital camera 10 according to the preferred embodiment of the invention. As shown in FIG. 1, a digital camera 10 is mainly comprised of an image capturing unit 20, an image capturing control unit 40, a processing unit 60, a display unit 100, and an operating unit 110.

The image capturing unit 20 includes structural and electrical members pertaining to photographing and image forming. That is, image capturing unit 20 is provided with a lens section 22, which captures an image and processes the captured image, a diaphragm 24, a shutter 26, an optical LPF or low pass filter 28, a CCD 30, and a capture-signal processor 32. The lens section 22 preferably includes a focus lens and a zoom lens. The structure makes it possible to form an image of an object on the surface of the light reception of the CCD 30. Each sensor element of the CCD 30, though it is not shown in FIG. 1, stores up electric charge (referred to as "stored electric charge"). The stored electric charge is taken up with a read gate pulse to a shift register not shown in FIG. 1, and subsequently taken out sequentially with a register transfer pulse as a voltage signal.

Since the digital camera 10 generally has an electric shutter function, a mechanical shutter such as the shutter 26 is not always necessary. A shutter drain is setup in the CCD 30 through a shutter gate in order to achieve the electric shutter function. When the shutter gate is activated, the stored electric charge is drained out to the shutter drain. Shutter speed, which is the time to store up the electric charge in each sensor element, can be controlled by controlling the shutter gate.

The voltage signal output from the CCD 30, that is, an analog signal, is color-separated by the capture-signal processor 32 into R, G and B elements, and the white balance is adjusted. The capture-signal processor 32 then takes place a gamma correction, sequentially converts the R, G and B signals from analog into digital form by the necessary timing, and outputs the obtained digital image data (referred to as "digital image data") to the processing unit 60.

The image capturing unit 20 further includes a finder 34 and a electronic flash 36. The finder 34 may be equipped with an LCD not shown in FIG. 1. In that case, the finder 34 displays various information provided by a main CPU 62 described later. The electronic flash 36 performs to emit light when the energy stored in a capacitor, not shown in FIG. 1, is supplied to a discharge tube 36a.

The image capturing control unit 40 is comprised of a zoom lens driver 42, a focus driver 44, a diaphragm driver 46, a shutter driver 48, an image capturing system CPU 50, which controls all of the above-mentioned drivers, a distance sensor 52, and a photometry sensor 54. Each of the drivers such as the zoom lens driver 42 has a driving means such as a stepping motor or the like. In a response to a snap of a release switch 114 described later, the distance sensor 52 gauges the distance defined between the camera and the object, and the photometry sensor 54 measures the brightness of the object. The gauged distance data (referred to as "gauged distance data") and the measured brightness data of the object (referred to as "measured luminance data") are transmitted to the image capturing system CPU 50. The image capturing system CPU 50 controls the zoom lens driver 42 and the focus driver 44 based on the photograph information provided by a user such as the magnification of the zoom lens, and makes adjustments of the magnification of the zoom lens and focus for the lens section 22.

The image capturing system CPU 50 determines an aperture value and a shutter speed, based on the integrated value of digital signals of RGB in one image frame, which is called as AE information. According to the aperture value and the shutter speed thus determined, the diaphragm driver 46 and the shutter driver 48 respectively adjust the amount of aperture and then drives the shutter 26 to open and close.

The image capturing system CPU 50 also controls the light intensity emitting from the electronic flash 36 based on the measured brightness data, and simultaneously adjusts the amount of aperture of the diaphragm 24. When a user instructs a camera to pick up an image, the CCD 30 starts to store up the electric charge. Then, the stored electric charge is output to the capture-signal processor 32 after the expiration of the shutter time calculated on the basis of the measured brightness data.

The processing unit 60 is comprised of a main CPU 62, which controls the whole digital camera 10, especially controlling the processing unit 60 itself, a memory controller 64, which is controlled by the main CPU 62, a YC processor 70, an optional device controller 74, a compression/extension processor 78, and a communication interface (I/F) section 80. The main CPU 62 communicates necessary information with the image capturing system CPU 50 by serial communication, for example. A clock generator gives an operating clock of the main CPU 62. The clock generator 88 also provides clocks of different frequencies respectively to the image capturing system CPU 50 and the display unit 100.

The main CPU 62 is also comprised of a character generator 84 and a timer 86. The timer 86 is backed up by batteries and counts the time and date continuously. This count value gives the main CPU 62 information about the time and date of photograph and other time information. The character generator 84 generates character information such as the time and date of photograph or a title. Those character information will then appropriately be superimposed with a photographic image.

The memory controller 64 controls a non-volatile memory 66 and a main memory 68. The non-volatile memory 66 is comprised of components such as an EEPROM or electrically-erasable programmable ROM, and a flash memory. The non-volatile memory 66 stores data such as setting information set by a user or an adjustment value before shipment, which should be kept even when the power of the digital camera 10 is turned off. The non-volatile memory 66 may store a boot program or a system program of the main CPU 62 if necessary. On the other hand, the main memory 68 may generally be a relatively inexpensive memory having a large capacity such as a DRAM. The main memory 68 has: a frame memory function, which stores data output from the image capturing unit 20; a system memory function, which is loaded with various programs; and a work area function. The non-volatile memory 66 and the main memory 68 control to transmit data back and forth among the components at the inside and outside of the processing unit 60 via a main bus 82.

The YC processor 70 undertakes a Y-to-C conversion on digital image data and generates a luminance signal Y and a chrominance signal B-Y and R-Y. The memory controller 64 temporarily stores the luminance signal and the chrominance signal in the main memory 68. The compression/extension processor 78 sequentially reads out the luminance signal and the chrominance signal from the main memory 68. The compression/extension processor then compresses the luminance signal and the chrominance signal. A memory card, which is one kind of the optional device 76, writes through the optional device controller 74 the compressed data described above (referred to as "compressed data").

The processing unit 60 further includes an encoder 72. The encoder 72 inputs a luminance signal and a chrominance signal. Then, the encoder 72 converts the luminance signal and the chrominance signal into video signals such as National Television System Committee (NTSC) and Phase Alternation by Line (PAL) signals. The encoder 72 outputs the converted video signals through a video output terminal 90. In order to generate a video signal from the data recorded in the optional device 76, firstly the data is transmitted to the compression/extension processor 78 through the optional device controller 74. Then, the data, which has been subjected to a necessary process by the compression/extension processor 78, is converted into a video signal by the encoder 72.

The optional device controller 74 undertakes a generation of necessary signals, a logic conversion, and a voltage conversion, between the main bus 82 and the optional device 76. The digital camera 10 may support, for example, an I/O card, which is a standard PCMCIA-compliant card, other than the above-described memory card, as an optional device 76. In this case, the optional device controller 74 may include a bus control LSI for PCMCIA.

The communication I/F section 80 controls such as a protocol conversion based on a communication specification for which the digital camera 10 supports, that is, a specification such as USB, RS-232C, or Ethernet, for example. The communication I/F section 80 may be provided with a driver IC if necessary, and communicates through external devices including networks and a connector 92. Other than those standard specifications, the communication I/F section can have a structure which exchanges data, through a particular interface, with an external device such as a printer, a karaoke device, or a game device.

The display unit 100 is comprised of an LCD monitor 102 and an LCD panel 104. A monitor driver 106 and a panel driver 108 respectively control the LCD monitor 102 and the LCD panel. The LCD monitor 102 may be, for example, a 2-inch monitor, and is set in the back of a camera. The LCD monitor 102 displays the modes of the present photographs and plays, magnification of the zoom lens for photographing and playing, the amount of energy left in batteries, time and date, a display for setting a mode, and subject images. The LCD panel 104 may be, for example, a small monochrome LCD, and is set on the top of a camera. The LCD panel 104 simply displays information such as the image quality described as FINE/NORMAL/BASIC, on/off of the electronic flash, the standard number of possible photographs, the number of pixels, and the amount of power left in the batteries.

The operating unit 110 is comprised of apparatuses and electric members, which are necessary for a user to set or instruct the operation or the mode of the operation of the digital camera 10. The power switch 112 determines whether the power of the digital camera 10 is turned on or off. The release switch 114 has a dual structure having the half push switch and the full push switch. For example, the half push switch locks AF and AE, and the full push switch captures a photographic image. After necessary processes such as the signal processing and the compression of data, the captured image will be stored in the main memory 68 or the optional device 76. The operating unit 110 may have a setting such as a rotary dial for mode or a cross key other than the power switch 112 and the release switch 114. The dial for mode and the cross key are collectively referred to as a function setting section 116 as in FIG. 1. There are "file format", "special effects", "photographic printing", "confirm/save", and "display switching", for example, as an operation or a function, which can be designated by using the operating unit 110. The zoom switch 118 is operated to set the magnification of zooming.

Figure 2:
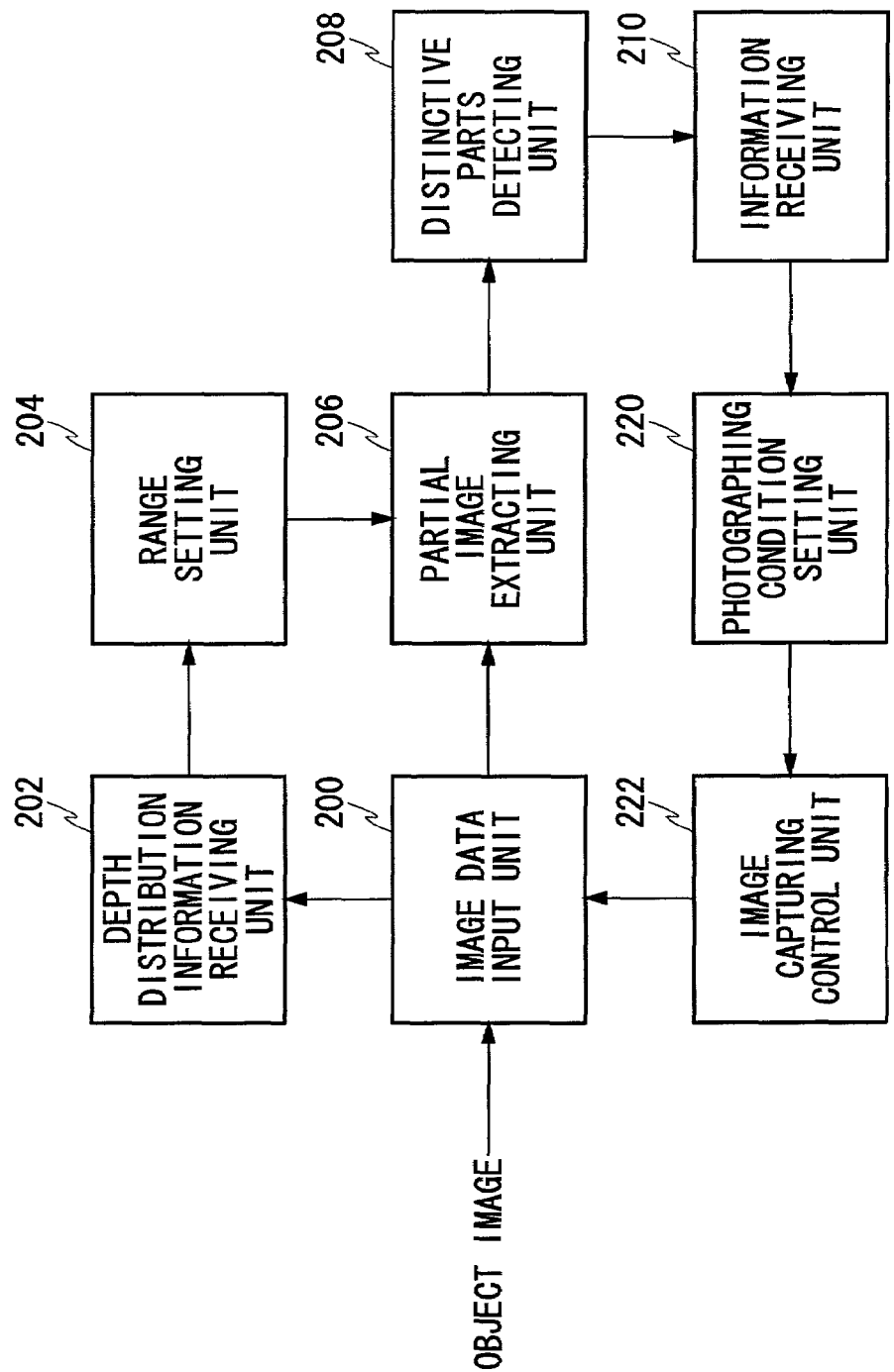
FIG. 2 is a functional block diagram of a digital camera according to the first embodiment.

FIG. 2 is a functional block diagram of the digital camera 10 according to the present embodiment. The digital camera 10 comprises an image data input unit 200, a depth distribution information receiving unit 202, a range setting unit 204, a partial image extracting unit 206, a distinctive parts detecting unit 208, an information receiving unit 210, a photographing condition setting unit 220, and an image capturing control unit 222. The image data input unit 200 inputs image data of an object. The image data input unit 200 corresponds to the image capturing unit 20 in FIG. 1. The image data input unit 200 also inputs a parallactic image, which picks up an image of an object from a plurality of different aspects.

The depth distribution information receiving unit 202 receives information about distribution of depth showing the distance from the lens to each part of an object, based on a parallactic image received from the image data input unit 200. In other words, the depth distribution information receiving unit 202 undertakes a process for deciding a corresponding point and calculates a parallax amount. Then, the depth distribution information receiving unit 202 extracts information about distribution of depth based on the calculated parallax amount. The process for extracting information about distribution of depth based on a parallax amount can be undertaken by the trigonometrical survey, which is conventionally known.

The range setting unit 204 sets a partial searching range, which decides a partial depth length for searching a main subject in image data. It is preferable that the partial searching range be set at a depth length, which has a high possibility for a main subject to exist. For example, since it is more likely that a main subject exists at a nearest place from a camera amongst all of the objects, the range setting unit 204 may set, based on information about distribution of depth, the depth length that includes an independent object existed in the nearest place, as a partial searching range.

If a main subject is not detected from the set partial searching range, the range setting unit 204 sets a further partial searching range. The partial searching range set after the first setting is set at a different depth length than the first setting. For example, the range setting unit 204 firstly sets a depth length to the nearest distance, and sets the next depth length at a contiguous distance from the first setting. Then, the range setting unit 204 may slide a range for setting a depth length as a partial searching range, and small increments are farther made until a main subject is detected.

This sliding method makes it possible for a camera not to misidentify the target object placed at different depths as one object in detecting a main subject since the sliding excludes objects at different depths from a searching target. Further, since this sliding method makes only a place of depth having a high possibility of existence of a main subject a searching target, the time for detecting a main subject can be shortened. Using this method, the image processing apparatus according to the present embodiment can detect a main subject with a high degree of accuracy or effectively.

The partial image extracting unit 206 extracts the part of the object included in a partial searching range from an image data as a partial image, based on information about distribution of depth. For example, the objects at long distances are not imaged in the partial image, which extracted an object at a closest distance. The distinctive parts detecting unit 208 detects from a partial image a distinctive part that should be included in a main subject. A distinctive part noted here means a necessary part, which has a distinctive feature especially something such as colors or shapes, from among other parts included in a main subject. For example, when a person is a main subject, the eyes or the mouth of the person is the distinctive part. It is preferable that a distinctive part have colors and shapes that objects other than the main subject do not have. For example, the color of a facial skin can be a target for detecting as a distinctive part since things other than human beings rarely have any chance to have the same color. Moreover, the eye color of human beings can also be a target for detecting as a distinctive part since things other than human beings rarely have any chance to have the same color.

The information receiving unit 210 receives the prescribed information of a main subject (referred to as "main subject information") based on the position of the distinctive part if the distinctive parts detecting unit 208 detects a distinctive part from a partial image. There is distance information between a lens and a main subject and information about luminance of a main subject, for example, as main subject information.

The photographing condition setting unit 220 decides photographing conditions based on main subject information. For example, the photographing condition setting unit 220 determines a focal distance based on distance information between the lens and a main subject. The photographing condition setting unit 220 also sets an aperture value and an exposure time or a shutter speed, based on luminance information of a main subject.

The image capturing control unit 222 controls the imaging by the image capturing unit 20 based on the photographing conditions set by the photographing condition setting unit 220. For example, the focal distance determined by the photographing condition setting unit 220 controls a zoom and a focus. Further, the aperture value and the exposure time set by the photographing condition setting unit 220 control the diaphragm 24 and the shutter 26.

An appropriate image can therefore be obtained by the apparatus or the camera according to the present embodiment since the camera takes a photograph in conditions suited to a main subject, which is detected with high precision.

Figure 3:
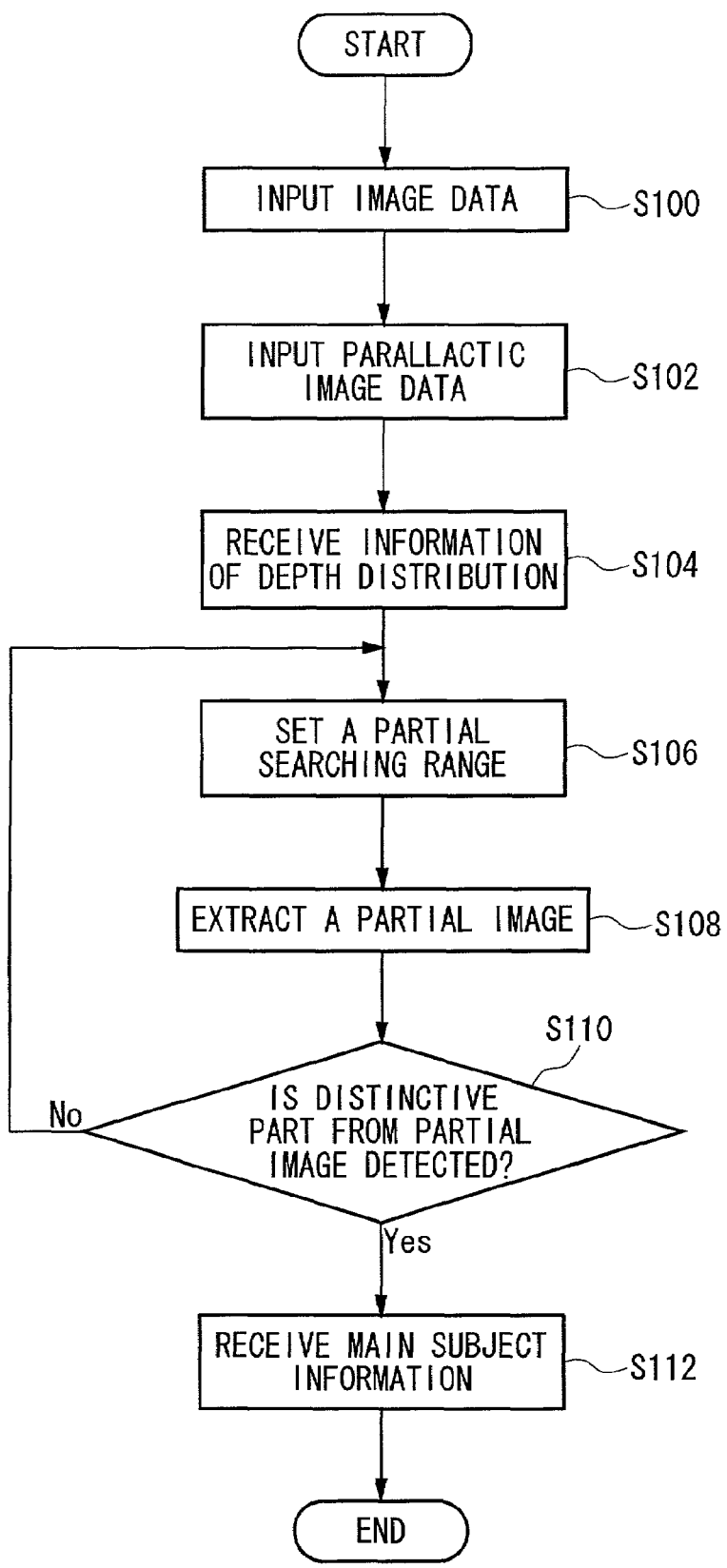
FIG. 3 is a flowchart showing an image processing method according to the first embodiment.

Referring now to FIG. 3, a flowchart showing an image processing method are shown according to the present embodiment. This flowchart especially shows the method for detecting a main subject. First, the image data input unit 200 inputs image data of an object at the step S100. The image data input unit 200 inputs parallactic image data at the step S102. Then, the depth distribution information receiving unit 202 receives information about distribution of depth at the step S104. The range setting unit 204 then sets a partial searching range at the step S106. The partial image extracting unit 206 extracts a partial image at the step S108. Then, the distinctive parts detecting unit 208 detects a distinctive part from a partial image at the step S110. If a distinctive part is not detected, the range setting unit 204 sets a different partial searching range. Then the steps from S106 through S110 are repeated until a distinctive part is detected. If a distinctive part is detected by the distinctive parts detecting unit 208, the information receiving unit 210 receives main subject information at the step S112.

The present invention according to the second embodiment will now be explained in the following. The image processing apparatus according to the present embodiment is a digital camera, which detects a plurality of main subjects from image data. The digital camera according to the present embodiment has almost the same structure and functions as the digital camera according to the first embodiment. Since the structure of the digital camera according to the present embodiment is substantially the same as the structure and functions shown in FIG. 2, the explanation is omitted. According to the present embodiment, the range setting unit 204 divides the depth length that includes all of the objects into a plurality of ranges. The range setting unit 204 then sets the divided depth length as searching ranges. The camera tries to detect a main subject from all of these searching ranges.

Figure 4:
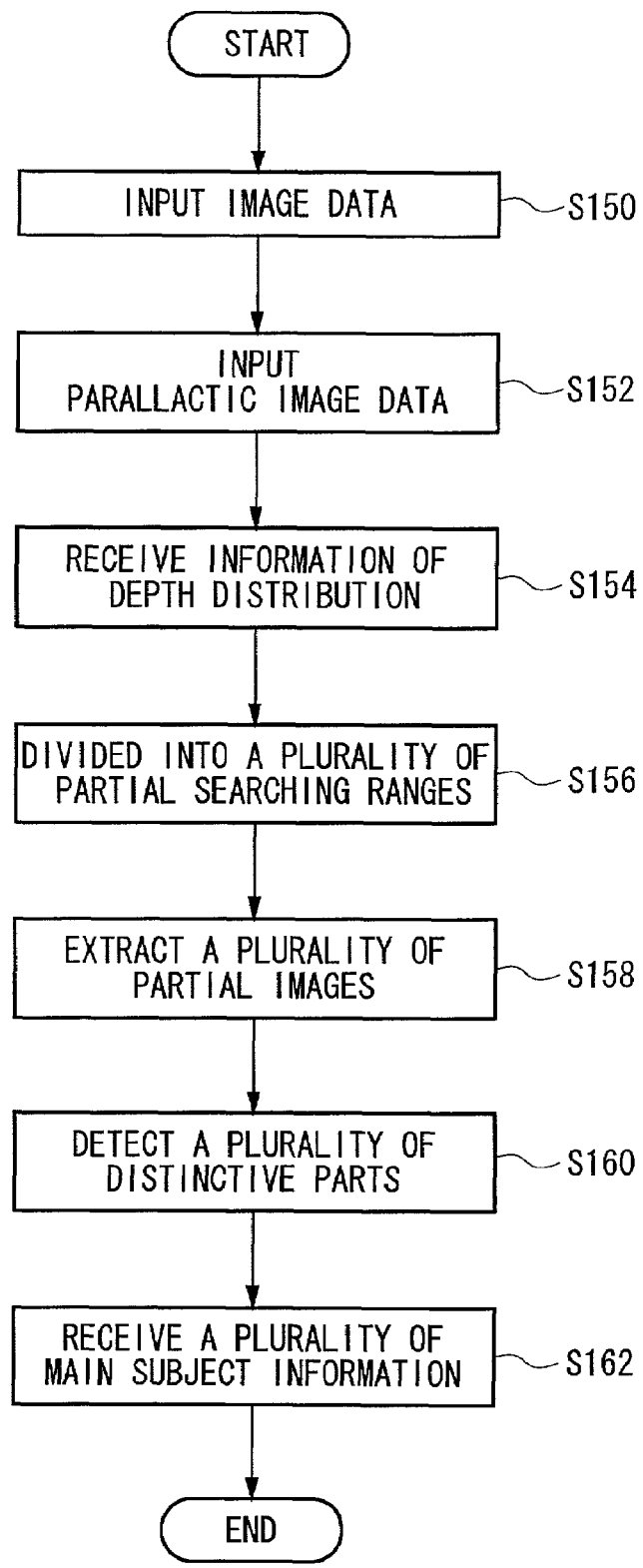
FIG. 4 is a flowchart showing an image processing method according to the second embodiment.

Referring now to FIG. 4, a flowchart showing an image processing method is shown according to the present embodiment. This flowchart especially shows a method for detecting a main subject. First, the image data input unit 200 inputs image data of an object at the step S150. The image data input unit 200 inputs parallactic image data at the step S152. Then, the depth distribution information receiving unit 202 receives information about distribution of depth at the step S154.

The range setting unit 204 then divides the depth length that includes objects in image data into a plurality of ranges. Then the range setting unit 204 sets the divided depth length as a plurality of partial searching ranges at the step S156. The partial image extracting unit 206 extracts from image data, the part included in each of a plurality of partial searching ranges as a plurality of partial image at the step S158. Then, the distinctive parts detecting unit 208 detects a distinctive part from each of a plurality of partial images at the step S160. The information receiving unit 210 receives main subject information from each of a plurality of the partial images where a distinctive part is detected, at the step S162.

A camera therefore divides the range of the depth that includes all of the objects and sets partial searching ranges. Then the camera detects a main subject from all of these partial searching ranges. Therefore, all of the main subjects can be divided up and detected without a misunderstanding when a plurality of main subjects are included in image data.

Figure 5:
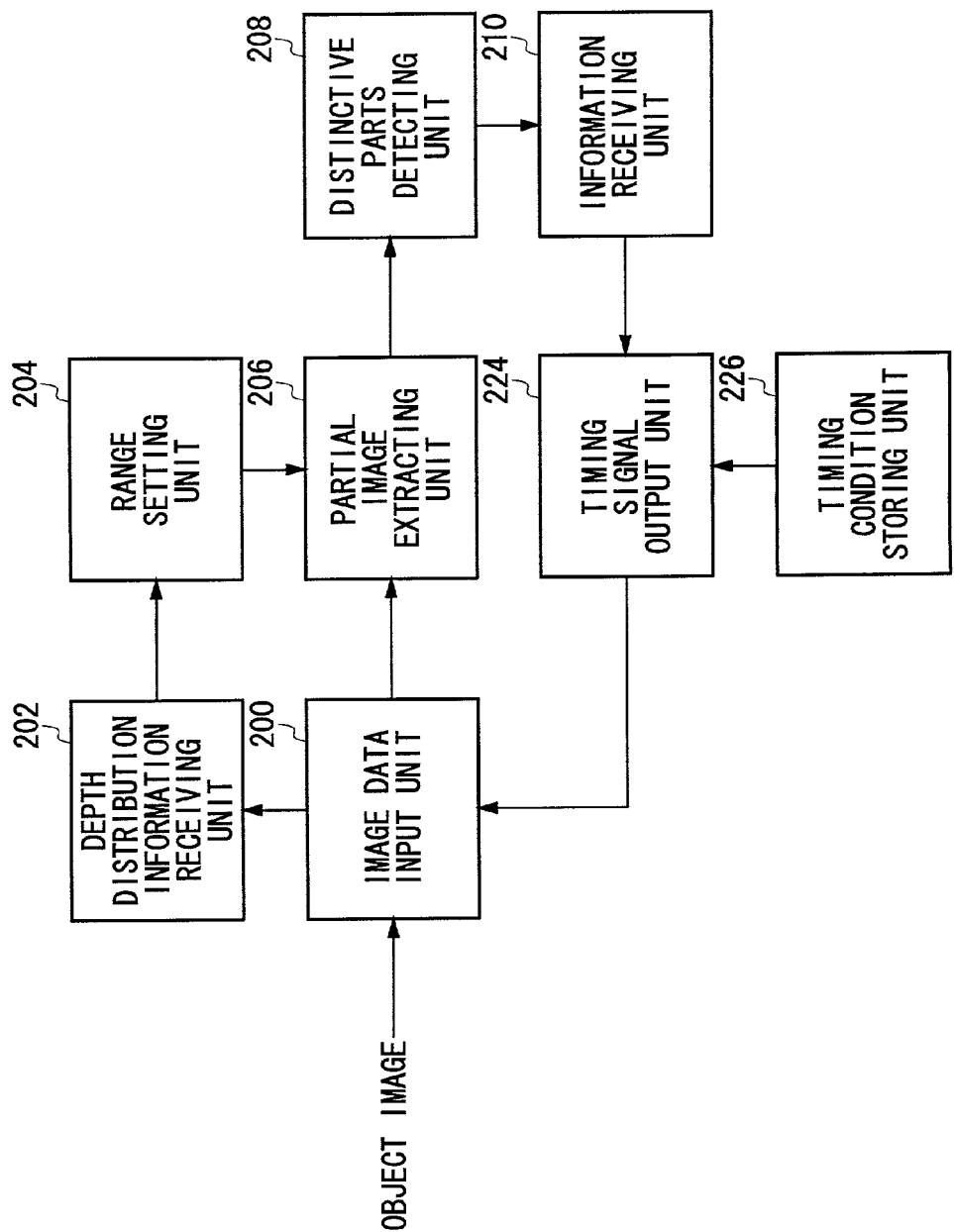
FIG. 5 is a functional block diagram of a digital camera according to the third embodiment.

The present invention according to the third embodiment will now be explained in the following. The image processing apparatus according to the present embodiment is a digital camera, which detects a main subject and photographs in the best timing. FIG. 5 is a functional block diagram of a digital camera according to the present embodiment. Since the depth distribution information receiving unit 202, the range setting unit 204, the partial image extracting unit 206, the distinctive parts detecting unit 208, and the information receiving unit 210 in FIG. 5 have the same functions as the first and second embodiments, the explanation is omitted.

The image data input unit 200 is an image capturing unit, which photographs an object based on a photographic timing signal. The image data input unit 200 corresponds to the image capturing unit 20 in FIG. 1. A timing condition storing unit 226 stores predetermined photographing conditions relating to a main subject. For example, when a person is a main subject, conditions such as "not blinking", "looking straight at the camera", or "smiling" of the person can be a photographing timing condition.

The timing signal output unit 224 outputs a photographic timing signal to the image data input unit when a distinctive part satisfies the photographic timing condition. The judgment method for judging if a distinctive part satisfies a photographic timing condition depends on the photographing conditions. For example, photographing conditions such as "not blinking" and "looking straight at the camera", the size of an eye, the shape of a mouth, or the size of a mouth can be decision making materials. Whether or not these decision making materials satisfy the photographing conditions depend on the decision by given algorithms based on the empirical rules for the respective photographing conditions.

Further, whether or not the person as a main subject takes a predetermined behavior can be a basis for deciding a photographic timing. For example, in a case where a person is set as a main subject, photographing is undertaken when the distinctive part of the person shows a predetermined change. As a predetermined change, "opened the eyes after closing the eyes for more than two seconds" or "the eyeshot depicted a given trajectory" can be thought, for example. As these photographic conditions, it is preferable that behaviors and changes that a person never takes in front of an ordinary camera be set as photographic conditions. These conditions are used to prevent photographing an undesired image by an object person accidentally taking the behaviors included in the photographic conditions.

The judgment method for judging whether or not the distinctive part satisfies a photographic condition differs depending on photographic conditions. If the photographic conditions are "blinking" and "eyeshot", the color, the shape, and the size of eyes are supposed to be the judgment making factors. Whether or not a judgment making factor satisfies a photographic condition depends on a given algorithm based on empirical rules for the respective photographic conditions.

The image data input unit 200 photographs an image in a timing based on a photographic timing signal received from the timing signal output unit 224.

Using this method, a desired image can be obtained since the time when a main subject, which is detected with high precision, becomes a desired condition is set as a photographic timing. Moreover, since a main subject can be detected effectively and quickly, a desired image can be obtained without missing a photographic timing.

Figure 6:
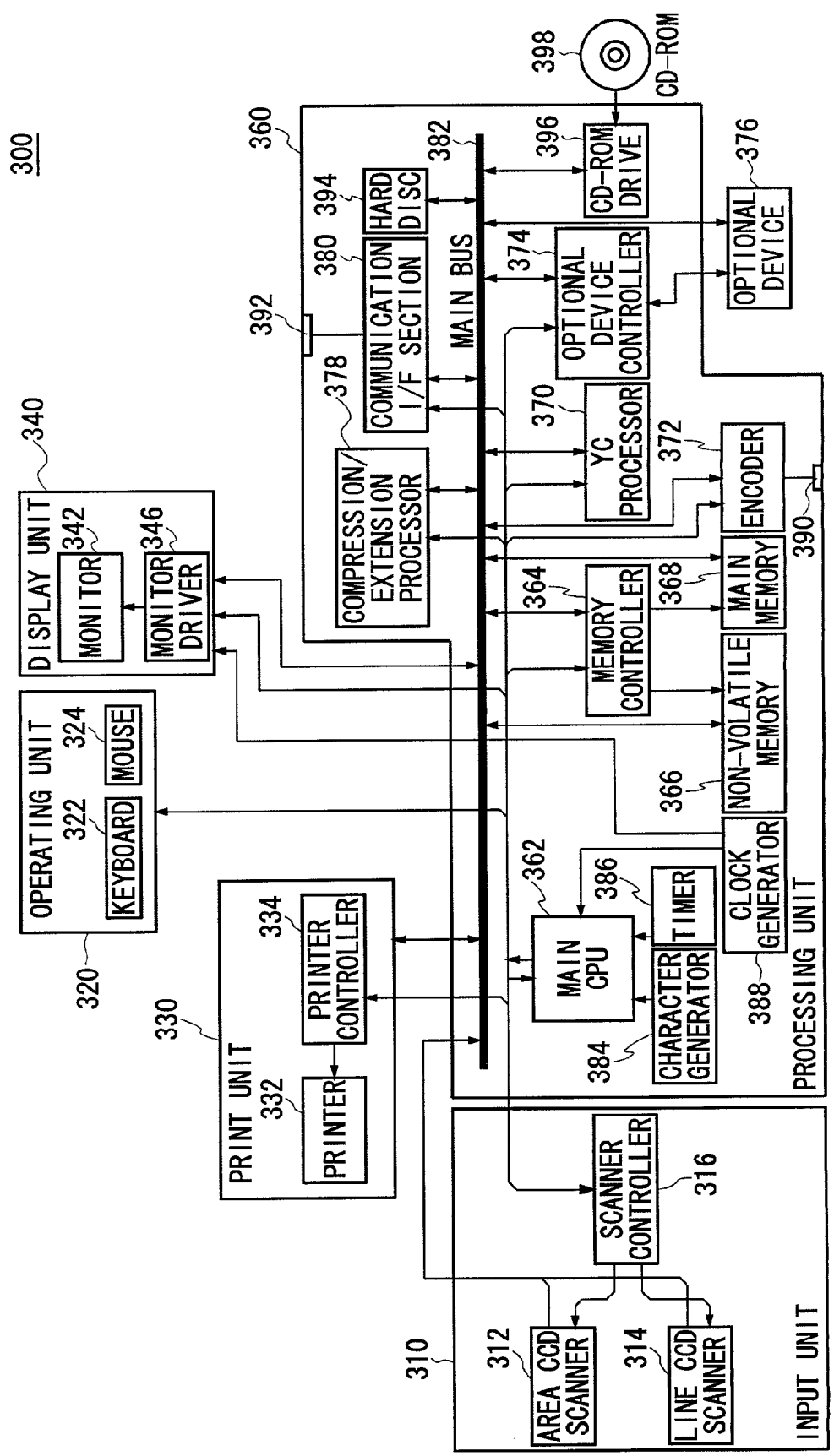
FIG. 6 shows a structural view of a laboratory system.

The present invention according to the fourth embodiment will now be explained in the following. The image processing apparatus according to the present embodiment is a laboratory system, which selects from a plurality of images, an image whose main subject is the best-looking image. Referring now to FIG. 6, a structural diagram of a laboratory system 300 is shown. This laboratory system mainly comprises an input unit 310, a processing unit 360, a print unit 330, a display unit 340, and an operating unit 320.

The input unit 310 comprises an area CCD scanner 312 and a line CCD scanner 314. The area CCD scanner 312 and the line CCD scanner 314 obtain image data by scanning the image on a film or a picture print. A scanner controller 316 controls the area CCD scanner 312 and the line CCD scanner 314. The input unit 310 outputs the obtained image data to the processing unit 360.

The processing unit 360 comprises the whole laboratory system, especially a main CPU 362, which controls the processing unit 360 itself, a memory controller 364, which is controlled by the main CPU 362, a YC processor 370, an optional device controller 374, a compression/extension processor 378, and a communication interface or I/F section 380. The operating clock of the main CPU 362 is provided from a clock generator 388. The clock generator 388 also provides clocks of different frequencies to the display unit 340.

The main CPU 362 also provides a character generator 384 and a timer 386. The timer 386 is backed up by batteries and counts the time and date continuously. The character generator 384 generates character information such as the time and date of a photograph or a title. Then, this character information will appropriately be combined with a photographic image.

The memory controller 364 controls a non-volatile memory 366 and a main memory 368. The non-volatile memory 366 is comprised of components such as an EEPROM or electrically-erasable programmable ROM, and a flash memory. The non-volatile memory 366 stores data such as setting information set by a user or an adjustment value before shipment, which should be kept even when the power of the laboratory system 300 is off. The non-volatile memory 366 may store a boot program or a system program of the main CPU 362 if necessary. On the other hand, the main memory 368 generally comprises a comparably cheap memory having a large capacity such as a DRAM. The main memory 368 performs: a frame memory function, which stores image data input by the input unit 310; a system memory function, which loads various programs; and a work area function. The non-volatile memory 366 and the main memory 368 control to exchange data between each part of the inside and outside of the processing unit 360 via the main bus 382.

The YC processor 370 undertakes a YC conversion on digital image data and generates a luminance signal Y and a chrominance signal B-Y and R-Y. The memory controller 364 temporarily stores the luminance signal and the chrominance signal to the main memory 368. The compression/extension processor 378 sequentially reads out the luminance signal and the chrominance signal from the main memory 368. The compression/extension processor then compresses the luminance signal and the chrominance signal. A memory card, which is one kind of the optional device 376, writes the compressed data described above (referred to as "compressed data"), through the optional device controller 374.

The processing unit 360 further comprises an encoder 372. The encoder 372 inputs a luminance signal and a chrominance signal. The encoder 372 then converts the luminance signal and the chrominance signal to video signals such as National Television System Committee (NTSC) and Phase Alternation by Line (PAL) signals. The encoder 372 outputs the converted video signals from a video output terminal 390. In order to generate a video signal from the data recorded in the optional device 376, firstly the data is transmitted to the compression/extension processor 78 through the optional device controller 374. Then, the data, which has been subjected to a necessary process by the compression/extension processor 378, is converted into a video signal by the encoder 372.

The optional device controller 374 undertakes a generation of necessary signals, a logic conversion, and a voltage conversion, between the main bus 382 and the optional device 376. The laboratory system 300 may support, for example, a floppy disc or an MO, other than the above-described memory card, as an optional device 76. In this case, the optional device controller 374 may include a floppy disc drive or an MO drive.

The communication I/F section 380 undertakes a control such as a protocol conversion based on a communication specification for which the laboratory system 300 supports, that is, a specification such as USB, RS-232C, or Ethernet, for example. The communication I/F section 380 may be provided with a driver IC if necessary, and communicates through external devices including networks and a connector 392.

The operating unit 360 further includes a hard disc 394 as a secondary storage unit. The hard disc 394 stores, for example, image data input by the input unit 310, image data that has undertaken given image processing, data read from the optional device 376, and data input through the communication I/F section 380.

The processing unit 360 further includes a CD-ROM drive 396. The CD-ROM drive 396, for example, activates the processing unit 360 and picks up a program from the CD-ROM for operating the processing unit 360 to perform predetermined functions.

The display unit 340 includes a monitor 342 and a monitor driver 346, which controls the monitor 342. A CRT monitor or an LCD monitor may be used as the monitor 342.

The operating unit 320 comprises apparatuses and electric members, which are necessary for a user to set or instruct the operation or the mode of the operation of the laboratory system 300. The operating unit 320 comprises, for example, a keyboard 322 and a mouse 324.

The print unit 330 comprises a printer 332 and a printer controller 334, which controls the printer 332. There are, for example, a laser printer and an inkjet printer as the printers 332.

Figure 7:
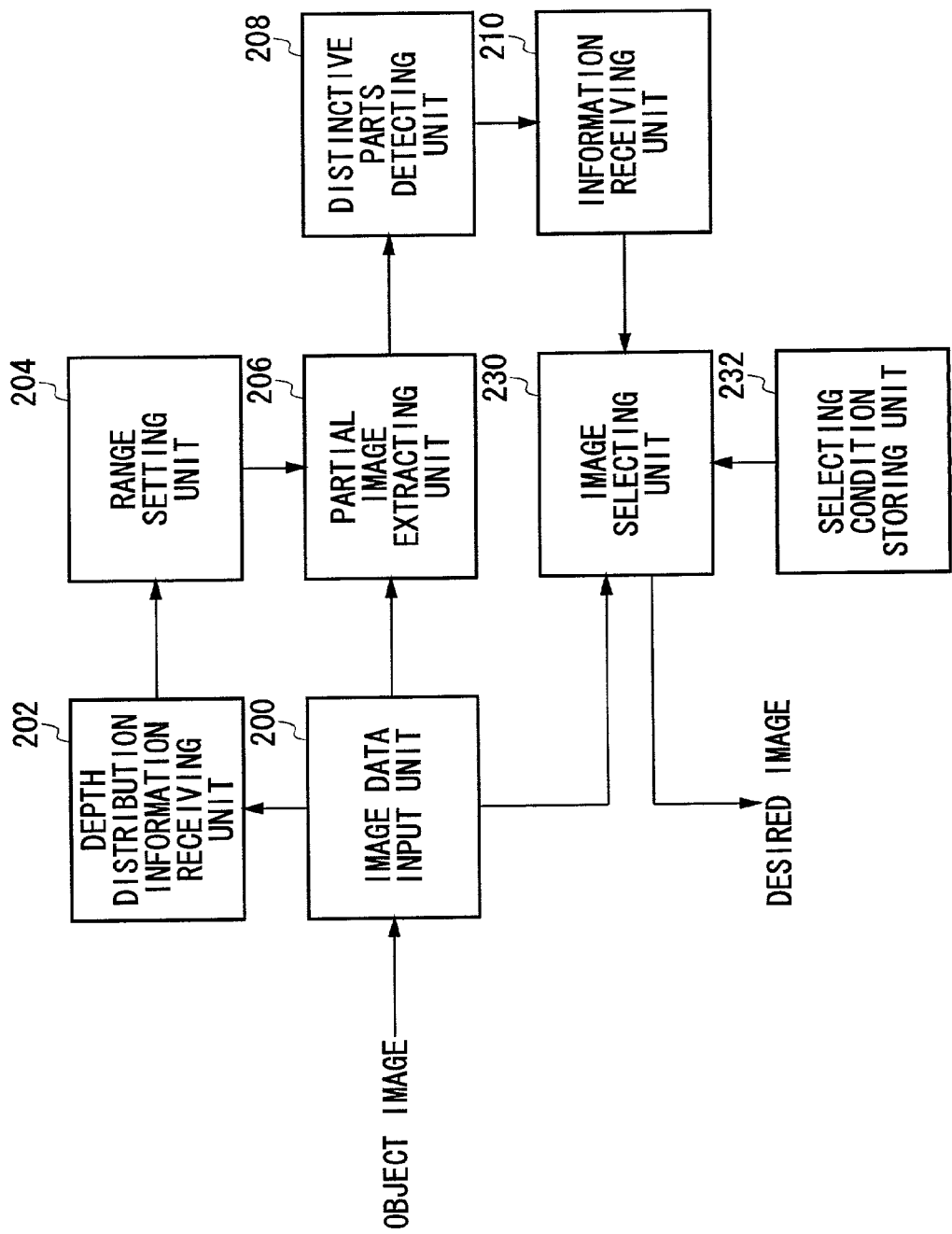
FIG. 7 is a functional block diagram of a laboratory system according to the fourth embodiment.

FIG. 7 is a functional block diagram of the laboratory system according to the present embodiment. Since the depth distribution information receiving unit 202, the range setting unit 204, the partial image extracting unit 206, the distinctive parts detecting unit 208, and the information receiving unit 210 shown in FIG. 7 have the same functions as the first and second embodiments, the explanation is omitted.

The image data input unit 200 inputs image data of an object. The image data input unit 200 corresponds, for example, to the input unit 310, the optional device controller 374, the communication I/F section 380, and the CD-ROM drive 396. When the image processing is undertaken by reading the image data from a film or a picture print, the area CCD scanner 312 or the line CCD scanner 314 included in the input unit 310 reads image data on the film or the picture print. When the image processing is undertaken by inputting image data recorded in a memory card, a card drive as the optional device controller 374 reads image data from a memory card as an example of the optional device 376. When image is inputted to be processed, for example, a floppy diskette drive serving as the optional device controller 374 reads out image data from a floppy diskette as an example of the optional device 376. It may also be applicable in another arrangement of the invention, that an MO drive serving as the optional device controller 374 reads out image data from an MO diskette as an example of the optional device 376.

When the image processing is undertaken by inputting image data recorded on a CD-ROM 398, the CD-ROM 398 reads image data from the CD-ROM drive 396. When image to be processed is inputted through a network, image data is taken in through the communication I/F section 380.

The selecting condition storing unit 232 stores predetermined selecting conditions relating to a main subject. The selecting conditions noted here means the conditions for selecting a desired image from a plurality of images. It is said that most of the objects photographed by cameras are of people. Therefore, in selecting a desired image from a plurality of images, whether or not an object person is looking good can be a basis for selection most of the time. According to the present embodiment, the laboratory system 300 selects a desired image from a plurality of images whose objects are persons. "Not blinking", "not red-eyed", "looking straight to the camera", or "smiling" can be thought of as conditions for a person to be photographed while looking good.

The judgment method for judging whether or not the distinctive part satisfies a photographic condition differs depending on photographic conditions. If the photographic conditions are as to "not blinking", "not red-eyed", and "looking straight to the camera", the color, the shape, and the size of the eyes are supposed to be the judgment making factors. If the photographic conditions are as to "smiling", the size of the eyes, the shape of the mouth, and the size of the mouth are supposed to be the judgment making factors. Whether or not these judgment making factors satisfy a photographic condition depend on a given algorithm based on empirical rules for the respective photographic conditions.

The image selecting unit 230 selects from a plurality of image data input by the image data input unit 200, a desired image data including a desired main subject that satisfies the selecting conditions. In other words, the image selecting unit 230 judges whether or not the main subject detected by the information receiving unit 210 satisfies the selecting conditions stored in the selecting condition storing unit 232. A desired image including a desired main subject that satisfies the selecting conditions will be stored on the hard disc 394 and be displayed on the monitor 342, in FIG. 6. The optional device controller 374 may record desired images on a recording medium such as a memory card, a floppy disc, and an MO. The communication I/F section 380 may output a desired image through a network.

According to another embodiment, this image processing apparatus may be a digital camera, which selects from a plurality of images, an image having the best look of a main subject. In this case, the structure of the digital camera is as shown in FIG. 1.

A desired image with high precision can therefore be selected since a main subject detected with high precision is supposed to be a target for deciding when selecting an image.

The present invention according to the fifth embodiment will now be explained. The image processing unit according to the present embodiment is a laboratory system, which detects a main subject and undertakes the appropriate image processing. Since the structure of this laboratory system is the same as the fourth embodiment in FIG. 6, the explanation is omitted.

Figure 8:
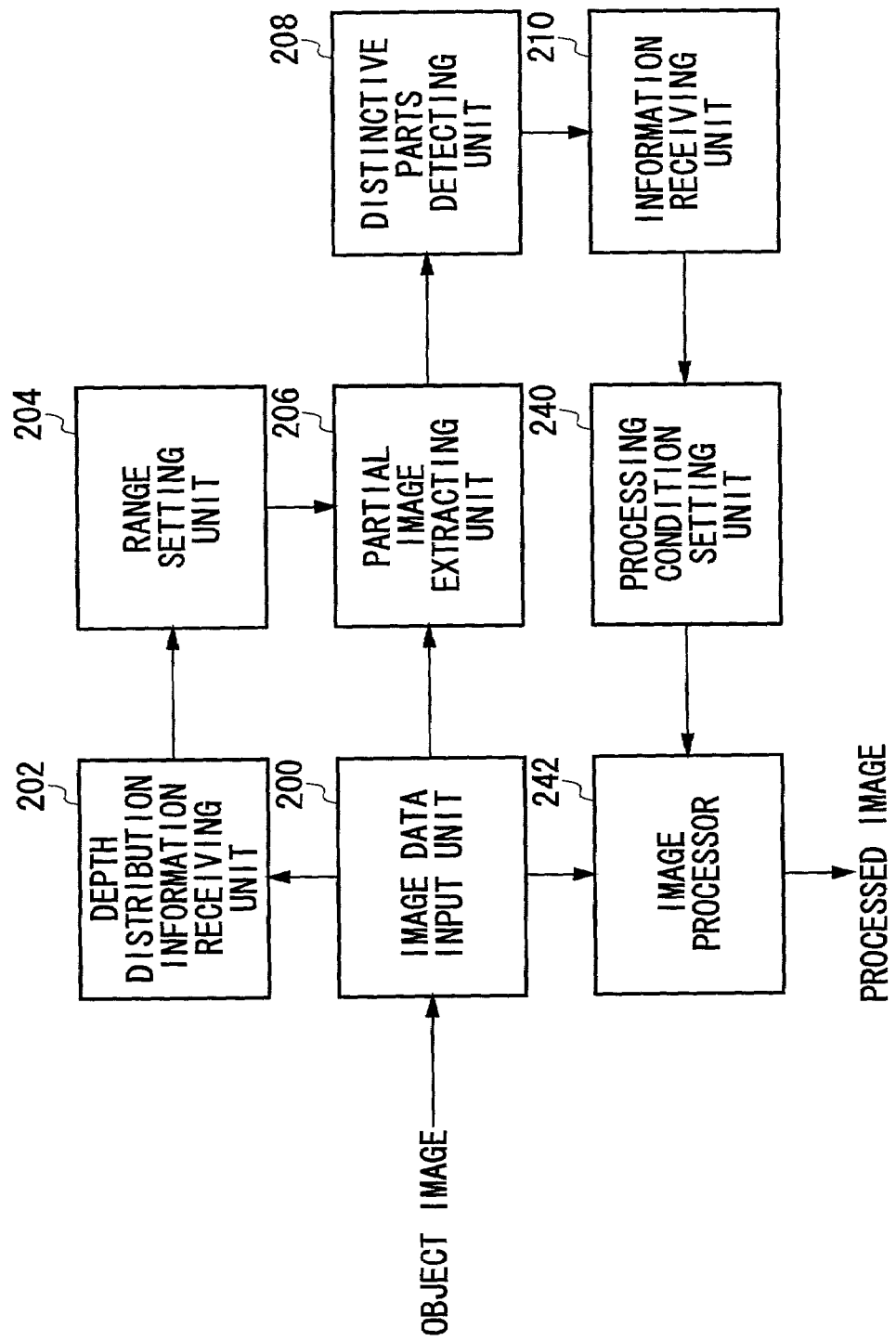
FIG. 8 is a functional block diagram of a laboratory system according to the fifth embodiment.

Referring now to FIG. 8, a functional block diagram of the laboratory system is shown according to the present embodiment. Since the image data input unit 200, the depth distribution information receiving unit 202, the range setting unit 204, the partial image extracting unit 206, the distinctive parts detecting unit 208, and the information receiving unit 210 have the same functions as the fourth embodiment, the explanation is omitted.

The processing condition setting unit 240 sets an image processing condition based on main subject information. The main subject information noted here means information about the position of a main subject in image data, for example. Conditions described in the following can be thought of as image processing conditions. For example, the processing condition setting unit 240 may decide conditions to undertake an image processing, which emphasizes the tint of the colors for the main subject and tones down the tint of the colors for the rest of the objects. Moreover, the processing condition setting unit 240 may also set conditions, which undertakes an image processing to tone the best gradation for both the main subject and the other subjects.

An image processor 242 undertakes image processing on an image based on the image processing conditions set by the processing condition setting unit 240. The processed image will be stored on the hard disc 394 in FIG. 6 and be displayed on the monitor 342. As the fourth embodiment, the optional device controller 374 and the communication I/F section 380 may output the processed image through a recording medium or a network.

According to another embodiment, this image processing apparatus may be a digital camera, which detects a main subject and undertakes the best image processing. In this case, the structure of the digital camera is as shown in FIG. 1.

A desired image can therefore be obtained since image processing is undertaken in conditions suited to a main subject detected with high precision. For example, different image processing can easily be undertaken for a main subject and other subjects.

The present invention according to the sixth embodiment will now be explained in the following. The image processing unit according to the present embodiment is a laboratory system, which detects a main subject and outputs an image in the best condition. Since the structure of this laboratory system is the same as the fourth embodiment in FIG. 6, the explanation is omitted.

Figure 9:
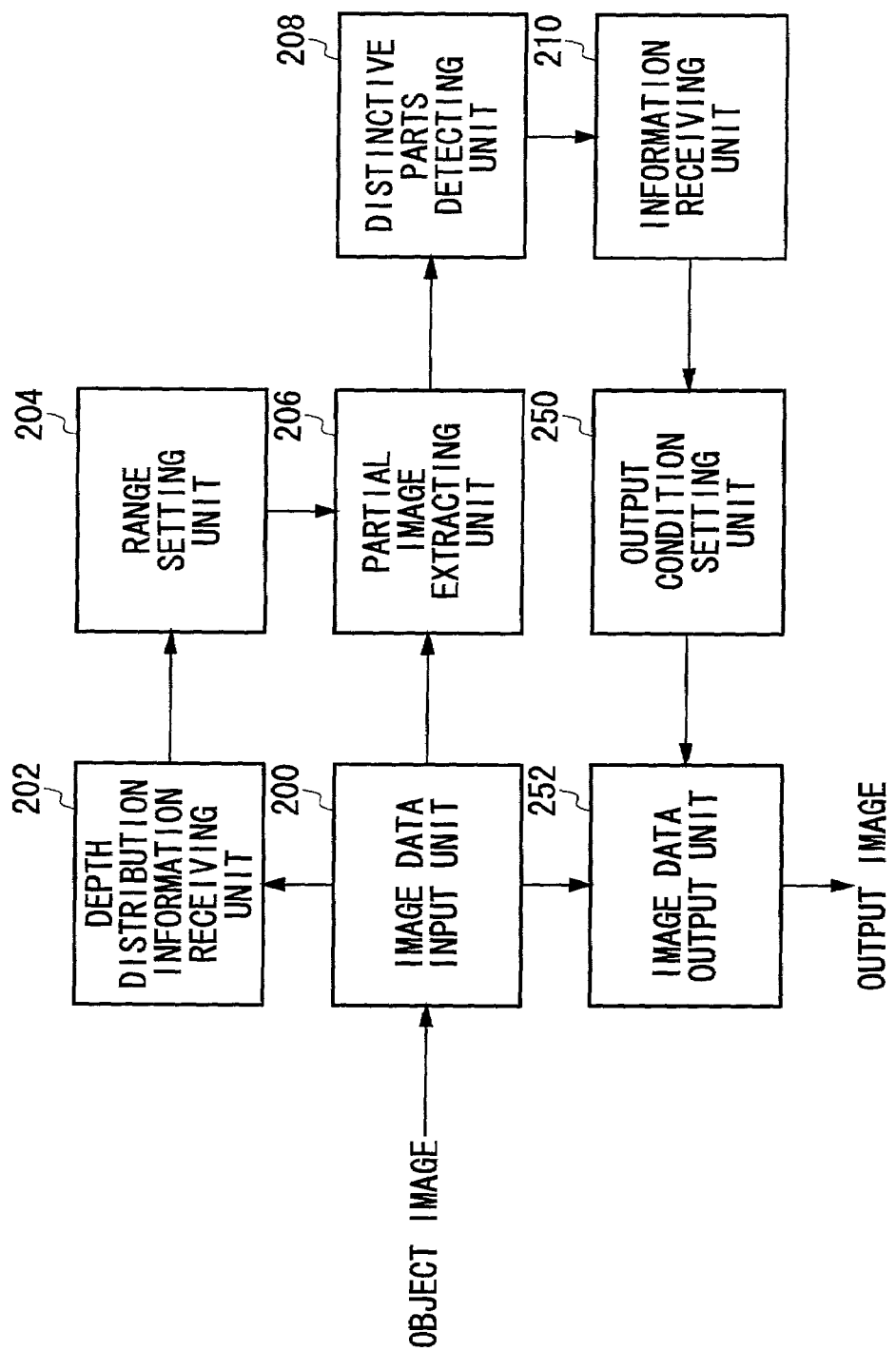
FIG. 9 is a functional block diagram of a laboratory system according to the sixth embodiment.

Referring now to FIG. 9, the functional block diagram of the laboratory system is shown according to the present embodiment. Since the image data input unit 200, the depth distribution information receiving unit 202, the range setting unit 204, the partial image extracting unit 206, the distinctive parts detecting unit 208, and the information receiving unit 210 have the same functions as the fourth and the fifth embodiments, the explanation is omitted.

The output condition setting unit 250 sets conditions for outputting images based on main subject information. The main subject information noted here means information about position of the main subject in image data, for example. The following conditions can be thought of as conditions for outputting images. It takes a little bit of time to display an image that has a large amount of data when a monitor displays an image. Therefore, the output condition setting unit 250 may, for example, set conditions to display the part of a main subject by priority and to display parts other than the main subject at a certain delayed time after the foregoing. Further, when a moving image is transferred through a network and is displayed on a monitor on the networks, the output condition setting unit 250 may decide conditions to set the rate of transfer for the part of the main subject high and for the parts other than the main subject low. Furthermore, the output condition setting unit 250 may decide conditions to undertake a process for modulating the frequencies for emphasizing the sharpness of the main subject and weakening the sharpness of the parts other than the main subject.

When the laboratory system 300 prints out an image as a photo, the output condition setting unit 250 may, for example, decide conditions to print based on the part of the main subject. Further, the output condition setting unit 250 may decide conditions to convert gradations differently between the parts of the main subject and the parts of the other subjects, according to the dynamic range of the image outputs of a printer or a monitor.

The image data output unit 252 outputs image data based on conditions for outputting images. The image data output unit 252 corresponds to the print unit 330 or the display unit 340 shown in FIG. 6.

According to another embodiment, this image processing apparatus may be a digital camera, which detects a main subject and outputs images in a best condition. In this case, the structure of the digital camera is as shown in FIG. 1.

Images of a main subject and other subjects can therefore easily be output in different conditions since a main subject can be detected with high precision based on depth distribution information.

The seventh embodiment of the present invention will now be described. According to the seventh embodiment, the image processing apparatus and the image processing method achieved in the embodiments from the first to the sixth are provided in a form of a recording medium recorded program software for realizing the functions on hardware. In this case, the main CPUs 62 and 362 activate based on a program stored in at least any one of the non-volatile memories 66 and 366, the main memories 68 and 368, the hard disc 394, and the CD-ROM 398. Electric computers such as a personal computer and a work station, for example, may be used as hardware, which operate based on this program.

Figure 10:
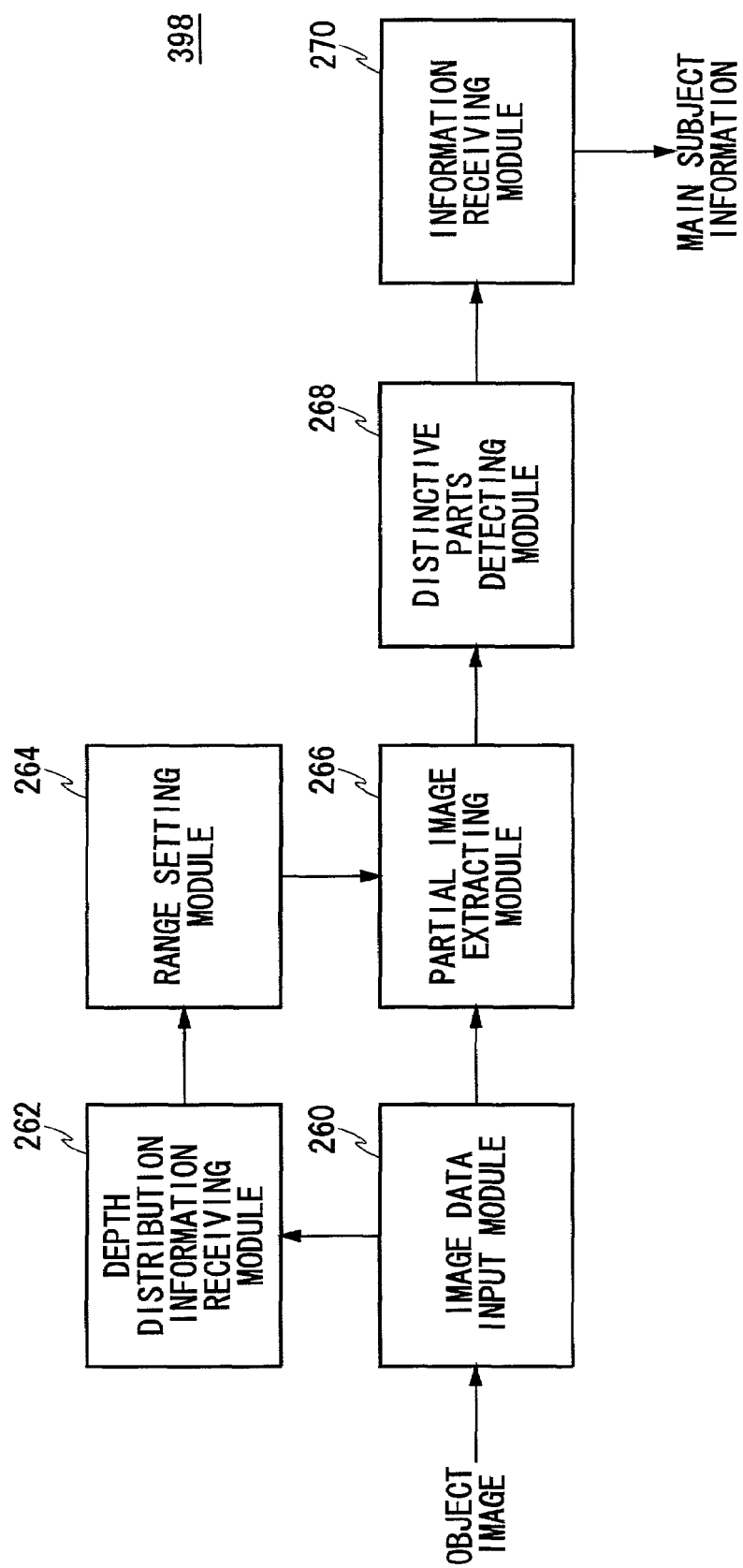
FIG. 10 is a block diagram showing the structure of a program according to the seventh embodiment.

FIG. 10 is a block diagram showing the system construction of the program according to the seventh embodiment. This program software is, for example, stored in a recording medium such as the CD-ROM 398 and is supplied to users. Generally, program software is installed in the hard disc 394 from a recording medium. The program software is then read to the main memory 368 or is read directly to the main memory 68 from the recording medium. The read program software is executed by the main CPUs 62 and 362.

As apparent from FIG. 10, the program according to the invention has a structure constituted by a combination of a plurality of program modules that have various functions. This program is generally comprised of an image data input module 260, a depth distribution information receiving module 262, a range setting module 264, a partial image extracting module 266, a distinctive parts detecting module 268, and an information receiving module 270. The image data input module 260 is a program for inputting image data of an object. The depth distribution information receiving module 262 is a program for receiving depth distribution information based on parallactic images. The range setting module 264 is a program for setting a partial searching range in image data. The partial image extracting module 266 is a program for extracting from image data, a part from many objects included in a partial searching range as a partial image, based on depth distribution information. The distinctive parts detecting module 268 is a program for detecting a distinctive part from a partial image. The information receiving module 270 is a program for receiving main subject information based on the detected distinctive part.

The CD-ROM 398 as an example of a recording medium can store a part of the operation or all of the functions of the main CPUs 62 and 362. The CD-ROM can also store a part of the operation or all of the functions of the other devices.

An optical recording medium such as a DVD or a PD, a magnetic recording medium such as a floppy diskette or a mini disc (MD), an optical magnetic recording medium such as an MO, taping recording medium, and a non-volatile semiconductor memory card can be used as a recording medium other than the CD-ROM 398. The recording medium, which stores the above program is only used for manufacturing an image processing apparatus. It is obvious that manufacturing and selling of those recording mediums as a business constitute an infringement of the patent right based on the present application.

In the embodiments described above, the searching range is defined, just for example, by the range of the depth length. However, the invention is not limited thereto or thereby. For example, the distance to the object may also be calculated on the basis of a range of parallax amount, a range of intensity of light reflected by an object as described hereinbelow, or a range of size of an object.

By the way, as discussed above, the searching range is defined, as an example, as the depth length in the foregoing embodiments. However, the invention is not limited thereto or thereby. The other ranges, for example, a range of parallax, a range of intensity of light reflected from an object, a range of size of an object and the like may also be employed as a searching range for measuring the distance from the object.

Further, in the embodiments described above, the depth distribution information receiving unit 202 is of a type called a passive type in which the depth distribution information indicating the distances to the respective parts of the object on the basis of the parallactic image input from image data input unit 200. However, the invention is not limited thereto or thereby. For example, the depth distribution information receiving unit 202 may be of a type called active type in which a light source irradiates light to an object and a distance between the light source and the object is measured on the basis of the intensity of the light reflected by the object. Some examples employing the active type of the distance measuring system are described with reference to FIGS. 11 through 14.

Because the distance measuring apparatus and method of the active type is disclosed in great detail in Japanese Patent Applications Nos. 2000-37771 and 2000-291623, merely the outline of which is described in the following.

Figure 11:
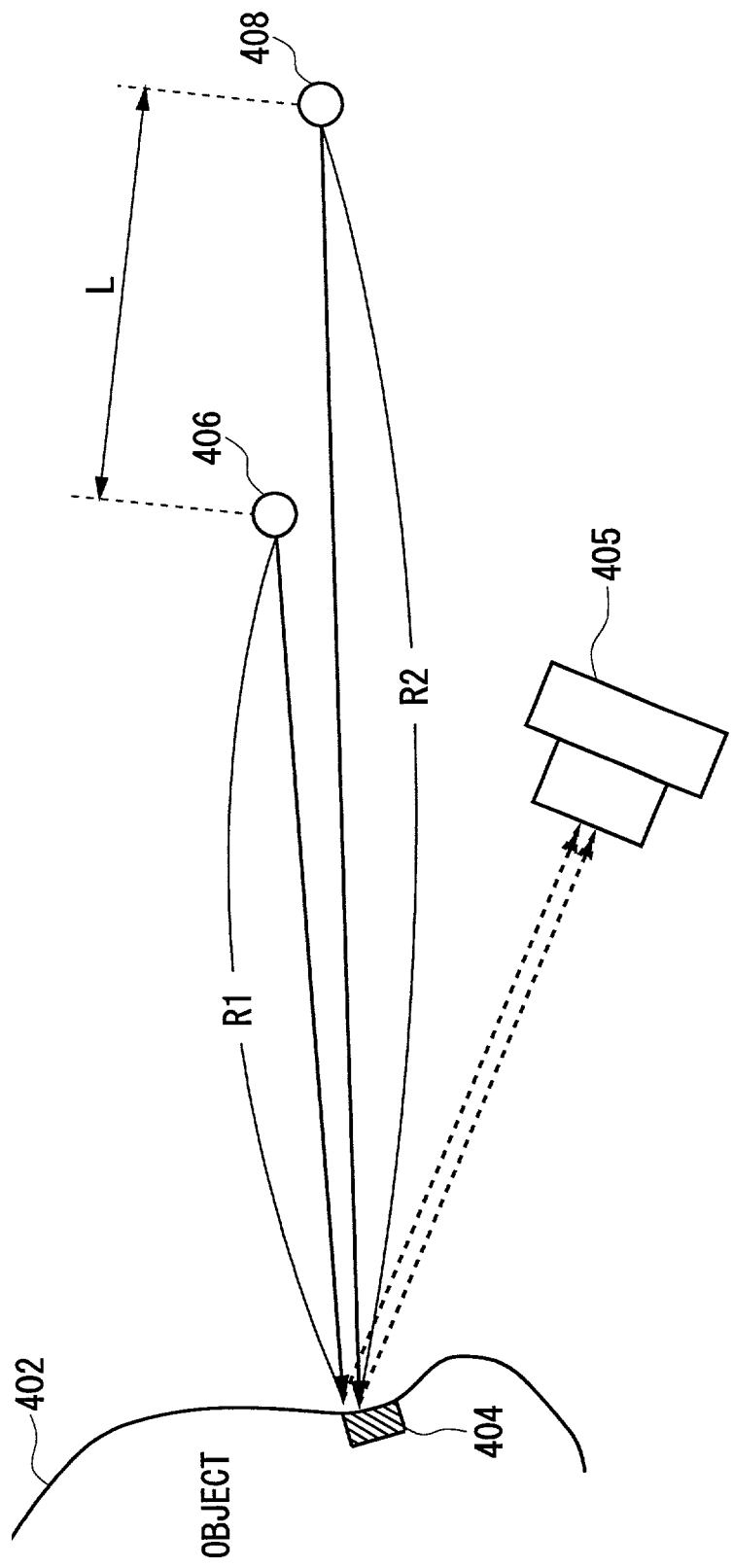
FIG. 11 is a schematic view showing a distance measurement system of an active type according to a first example.

FIG. 11 is a schematic view showing a distance measurement system of an active type according to a first example.

The system includes a first light source 406 and a second light source 408 performing as point sources which irradiate light having the same wavelength. The first light source 406 and second light source 408 are distanced from an object 402 by distances R1 and R2, respectively. The first light source 406 is distanced from the second light source 408 by a length L.

First, the light irradiating from the first light source 406 is reflected by a region 404 of the object 402, and the reflected light is captured by a camera 405. After a predetermined time, the second light source 408 irradiates a light toward the object 402, and the reflected light is captured by the camera 405. The intensity of both the lights irradiating from the first light source 406 and second light source 408, the intensity of both the lights captured by the camera 405, a ratio of the intensity of the reflected lights and the distance L between the light sources are calculated with a following equation 1.

$$R1 = L/\{(W1/W2 \cdot I1/I2)^{1/2} - 1\} \quad (1)$$

where R1 is a distance between the first light source 406 and the region 404 of the object 402, L is a distance between the first light source 406 and second light source 408, W1 and W2 are the intensity of lights reflected by the region 404 of object 402, respectively, and I1 and I2 are the intensity of lights irradiating from the first light source 406 and second light source 408, respectively.

As described above, the distance between the light source and the object can be measured by irradiating two lights having the same wavelength at a different timing. On the other hand, however, the distance can also be measured by irradiating two lights having different wavelength from each other at the same time and detecting the reflected lights from the object.

Figure 12:
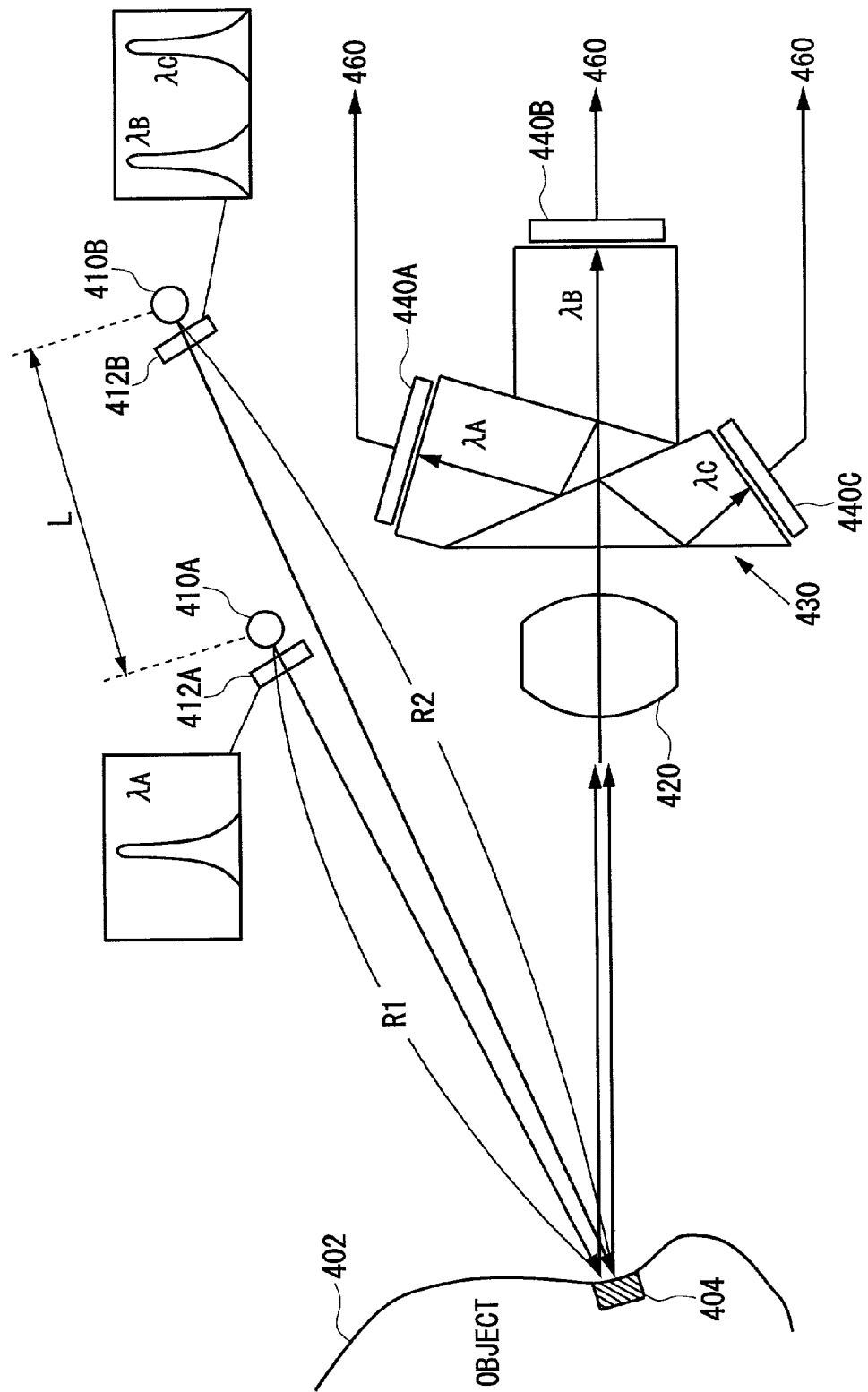
FIG. 12 is a schematic top view showing a distance measurement system of an active type according to a second example.

FIG. 12 is a schematic top view showing a distance measurement system of an active type according to a second example.

In this example, a first light source 410A and a second light source 410A irradiate lights at the same time. Those lights pass through a 412A and a 412B, respectively, to thereby generate a light having a wavelength λA and a light having wavelength λB and λC, respectively, and illuminate the region 404 of the object 402. The reflected lights are focused by an optical lens 420 and subsequently enter a beam splitter unit 430 constituted by prisms in which the lights are split into three different lights having wavelength λA, λB and λC, respectively. Light receiving units 440A, 440B and 440C receive the respective light as shown in FIG. 12. The lights received by the light receiving units are processed by a processing unit 460 having a light intensity detecting section not shown in the figure drawings. The distance from the light source and the region 404 of the object 402 is then measured by detecting the intensity of the three different lights each having a different wavelength. The process of measuring the distance is substantially the same as that discussed above for the first example.

Figure 13:
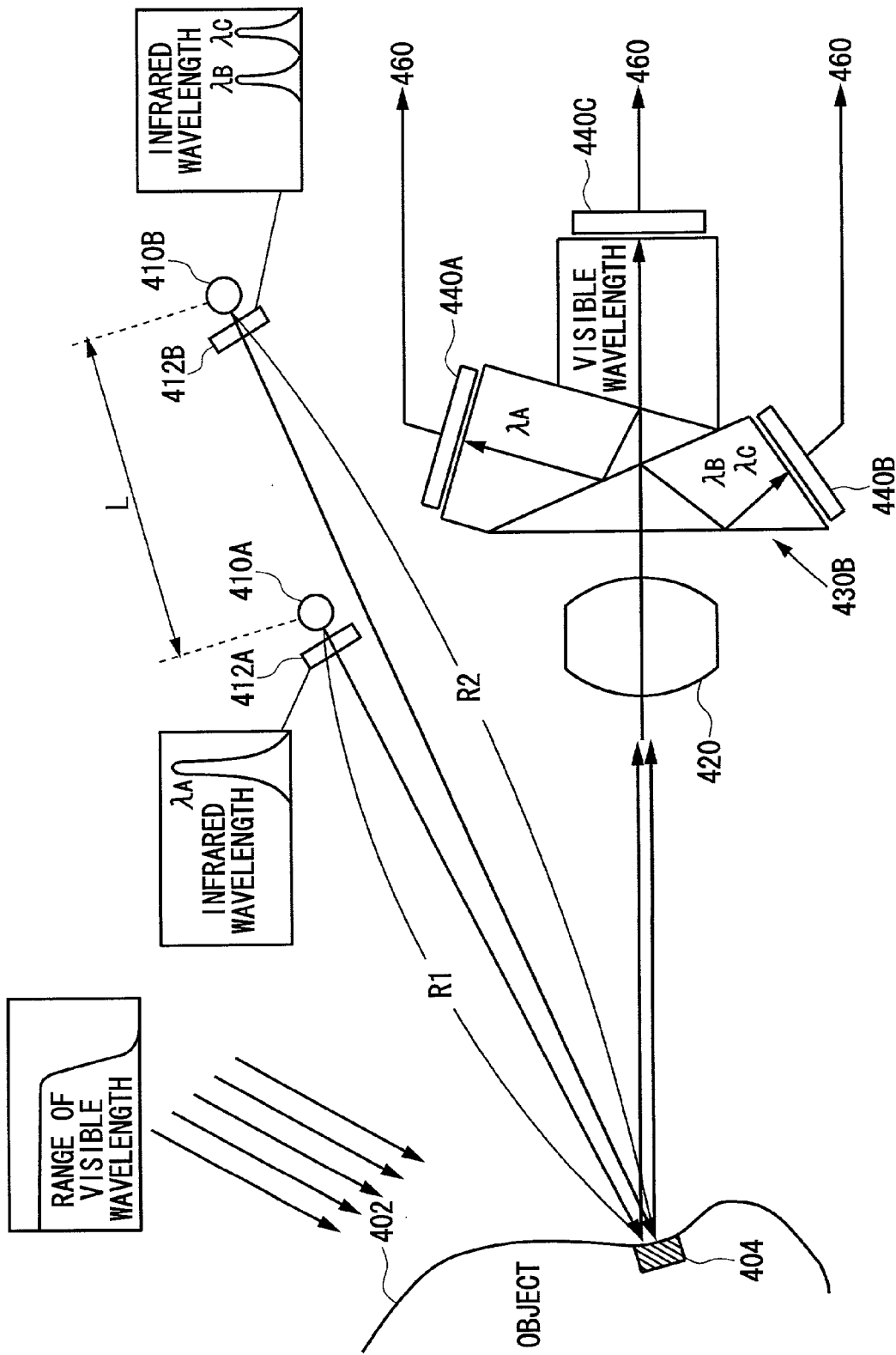
FIG. 13 is a schematic top view showing a distance measurement system of an active type according to an arrangement of the second example illustrated in FIG. 12.

FIG. 13 is a schematic top view showing a distance measurement system of an active type according to an arrangement of the second example illustrated in FIG. 12.

A first light source 410A and an optical filter 412A produce a light having an infrared wavelength λA while a second light source 410A and an optical filter 412B do a light having two infrared wavelength λB and λC, and those lights are irradiated toward the region 404 of the object 402. On the other hand, the object 402 also receives visible, available light from the sun or a flash light device. On the other hand, a beam split unit 430B constituted by prisms receives the reflected lights from the region 404 of the object 402 and then splits those lights into three lights, λA, λB and λC, and a visible light. The 440A, 440B and 440C receives the respective lights split by the beam split unit 430B. The distance from the light source and the region 404 of object 402 is then calculated by detecting the intensity of the three different lights each having a different wavelength. The process of measuring the distance is substantially the same as that discussed above for the first example.

According to the first and second examples along with these arrangements shown in FIGS. 11 through 13, the distance measuring systems employ, by way of example, two different light sources. However, three or more light sources may be equipped in order to enhance the accuracy or speed of the measurement.

Figure 14:
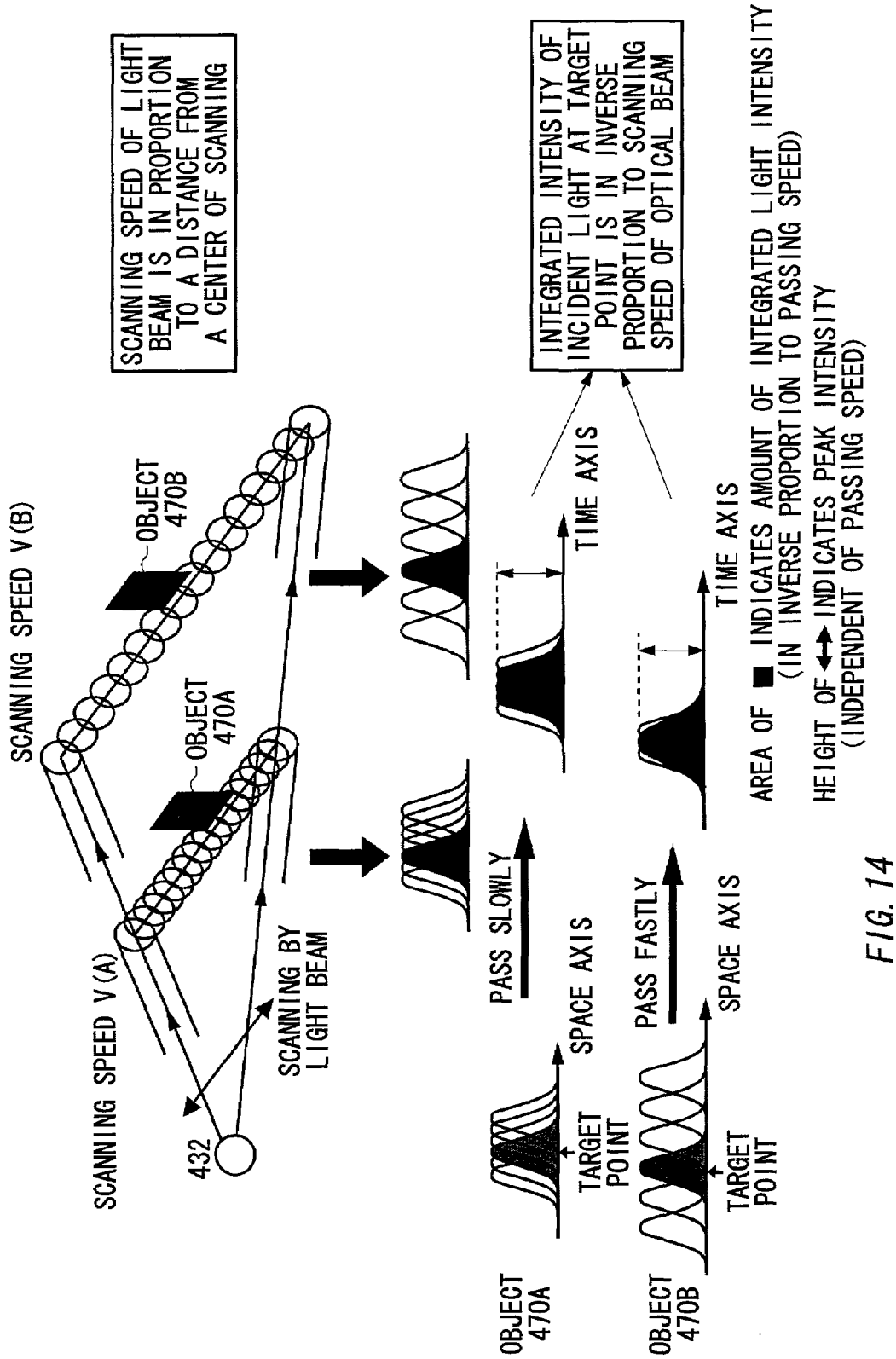
FIG. 14 is a chart for explaining the concept of the distance measuring system according to a third example of the present invention.

FIG. 14 is a chart for explaining the concept of the distance measuring system according to a third example of the present invention.

As shown in the drawing, an object 470A is distanced from a startpoint 432 for the distance measurement by a distance D(A) while an object 470B is distanced from the startpoint 432 for the distance measurement by a distance D(B). Now a light beam emitting from the startpoint scans a plane perpendicular to a line connecting the startpoint 432 and the object 470A at the same scanning speed V(A). During this scanning, a scanning speed V(B) of the light beam for scanning a plane perpendicular to a line connecting the startpoint 432 to the object 470B is in proportion to a distance D(B) from the startpoint 432 to the object 470B. On the other hand, as the light beam scans at the save speed V(A), the time required for scanning a target point of the object 470B is in inverse proportion to a distance D(B). Therefore, the greater the distance D(B), the smaller the amount of integrated intensity S(B) of light beam irradiating the object 470B during the scanning period. On the other hand, a peak intensity P(B) of light beam irradiating the object 470B does not depend on the distance D(B) provided that the light beam is a pure parallel beam. For the facts set forth above, accordingly, the distance D(B) can be measured out by detecting the amount of integrated intensity S(B) of light beam and the peak intensity P(B) and also referring to a lookup table which stores previously the relations of the distance D(B) and the ratio of the amount of integrated intensity S(B) of light beam and the peak intensity P(B).

Figure 15:
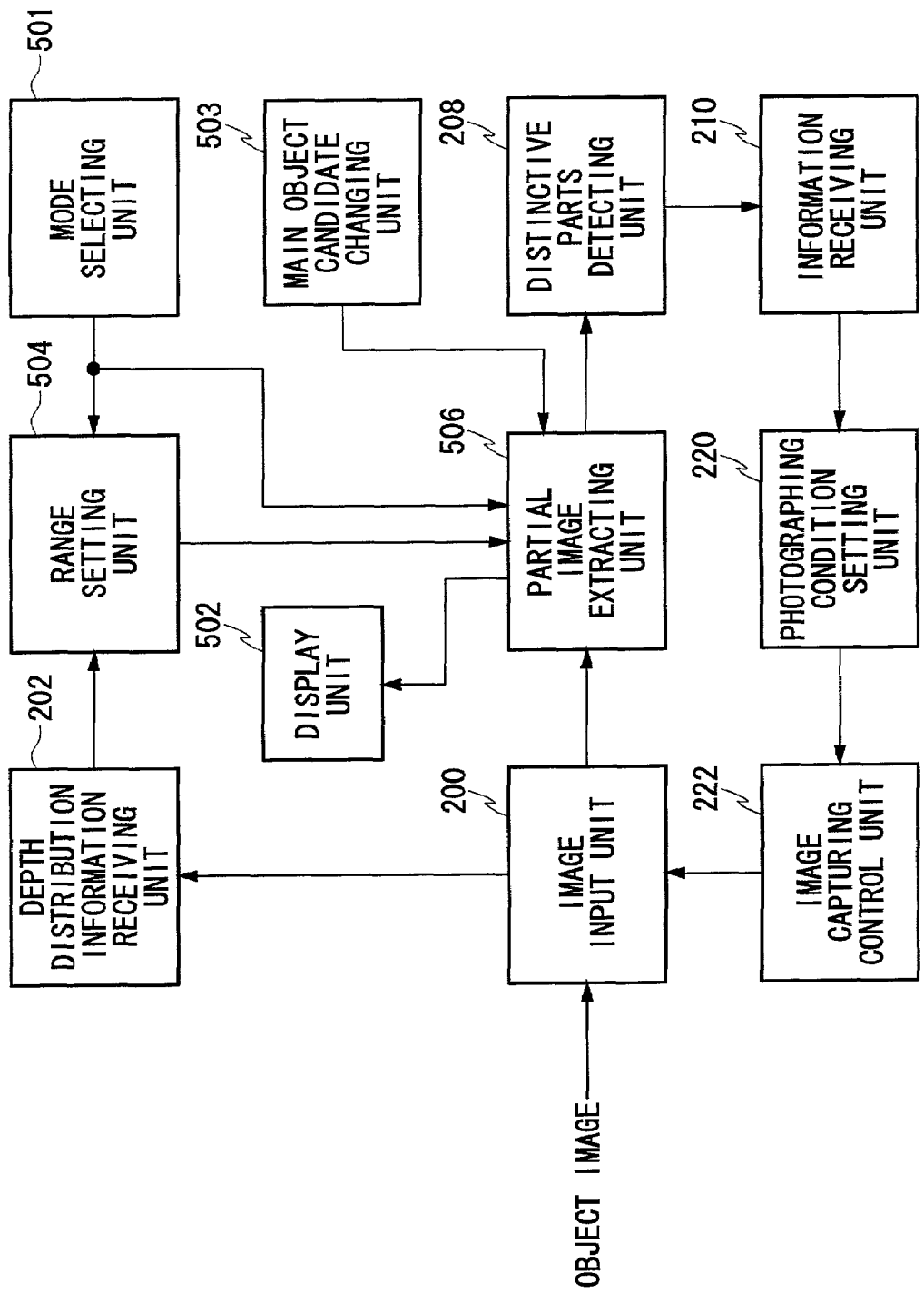
FIG. 15 is a functional block diagram of the digital camera according to the eighth embodiment of the invention.

Next, an eighth embodiment of the present invention will now be described. FIG. 15 is a functional block diagram of the digital camera according to the eighth embodiment of the invention. In FIG. 8, like parts and components are designated by the same reference signs as those shown in FIG. 2 which concerns the first embodiment.

In the first embodiment, when the range setting unit 204 searches a main object, the partial searching range is automatically determined to search merely a depth length in which the main object would likely exists under a presupposition that the main object is usually a person or persons and that the main object usually stands at the frontmost position in the image close to camera. The eighth embodiment, however, is provided with functions which is capable of being applicable to unusual pictures of which the main object is not a person or persons but a bird, flowers, or a landscape.

As shown in FIG. 15, first, an operator of a digital camera inputs a desired operation mode through a mode selecting section 501. The desired mode may be that, for example, the main object is a wild bird perching on a top of a tree far distanced from the camera or one uncommon flower among many flowers in a flower garden in the middle thereof. In this case, the operator manually sets a selection dial for main object and a distance dial to a desired mode at the mode selecting section 501. The operation mode which is selected through the mode selecting section 501 is input to a range setting unit 504. The range setting unit 504 determines a partial searching range in accordance with the given operation mode.

Next, a partial image extracting unit 506 detects a target part to be included in the main object within the depth length range determined by the range setting unit 504. As information with respect to the object intended by the operator is also transmitted to the partial image extracting unit 506, the partial image extracting unit 506 can perform the searching operation accurately at a high speed. This is because that, for example, if a flower is the intended object, the target part may be a petal above leaves, whereas the target part may be an eye and a bill in front of the eye in a case where a bird is an intended object. The partial image extracting unit 506 thus determines the candidates of the target part of the object on the basis of information included in the operation mode the operator selected.

The candidate of the main object detected by the partial image extracting unit 506 is displayed on a display unit 502. If applicable, the candidate of the main object may be framed with a white line, or the white line may be blinked, so that the operator can readily recognize which object is now selected as a main object while viewing the screen of the display unit 502. If the candidate of the main object is not the one the operator intended, he or she operates a dial or button of a main object candidate changing section 503 to move to the next candidate. The operation repeats until the desired object is selected.

According to the eighth embodiment, there is no possibility of misidentification of the main object since the operator selects the main object while looking at the display unit. In particular, this system is effective in a case where the main object is not a person or persons.

As described above, since objects having different depth positions are excluded from a searching target, the possibility of recognizing the objects having different depth positions as one object in detecting a main subject can be decreased. Further, since only the depth position has a high possibility of existence as a main subject as a target for searching, the time for detecting a main subject can be shortened. The image processing apparatus according to the present embodiment can therefore detect a main subject with high precision and effectively.

Further, according to the first embodiment, an appropriate image can be obtained since the camera takes a photograph in conditions suited to a main subject detected with high precision.

Furthermore, according to the second embodiment, the camera divides the depth range that includes all of the objects, and sets a plurality of partial searching ranges. Then a main subject is detected from all of these partial searching ranges. Therefore, all of the main subjects can be divided up and detected without misunderstanding when a plurality of main subjects are included in image data.

Moreover, according to the third embodiment, a desired image can be obtained since the time when a main subject detected with high precision becomes a prescribed condition is set as a photographic timing. A desired image can also be obtained without missing a photographic timing since a main subject can be detected effectively and quickly.

Further, according to the fourth embodiment, a desired image with high precision can be selected since a main subject detected with high precision is set as a target when deciding selection of an image.

Furthermore, according to the fifth embodiment, a desired image can be obtained since an image processing is undertaken in conditions suited to a main subject being detected with high precision. For example, different image processing can easily be given to both the main subject and the other subjects.

Moreover, according to the sixth embodiment, images of the main subject and the other subjects can easily be output indifferent conditions since a main subject can be detected with high precision based on depth distribution information.

Still further, according to the eighth embodiment, there is no possibility of misidentification of the main object because the operator of the digital camera selects the main object while viewing same on the screen of the display unit.

As is obvious in the explanation described above, a main subject can be detected from an image according to the present invention.

Although the present invention has been described by way of exemplary embodiments, it should be understood that those skilled in the art might make many changes and substitutions without departing from the spirit and the range of the present invention, which is defined only by the appended claims.

What is claimed is:

1. An image processing apparatus, comprising:
 an image data input unit for inputting image data of a plurality of objects including a main subject, said image data input unit comprises a means for inputting a parallactic image, which is generated by capturing said plurality of objects viewed from a plurality of different perspectives;
 a depth distribution information receiving unit for receiving a depth distribution information calculated from said parallactic image, said depth distribution information being included in said image data and indicating a distance to each of said plurality of objects from the image data input unit;
 a range setting unit for setting a searching range in a depth direction for searching for said main subject from the plurality of objects using the input image data;

a partial image extracting unit for extracting, as a partial image, at least a portion of one of said plurality of objects from said image data based on said depth distribution information, the depth direction of said partial image being restricted to said searching range set by said range setting unit; and a main subject detecting unit for receiving main subject information and detecting whether said partial image is said main subject based on said main subject information, wherein in searching for said main subject from the plurality of objects, said partial image extracting unit extracts first, as the partial image, at least a portion of said one of said plurality of objects that is closest in distance in the depth direction.

2. The image processing apparatus as claimed in claim 1, wherein said main subject information includes position of a distinctive part; and said main subject detecting unit comprises:

a distinctive parts detecting unit for detecting whether said partial image is said main subject based the position of the distinctive part, which should be included in said main subject.

3. The image processing apparatus as claimed in claim 1, wherein:

said range setting unit comprises a means for setting a first searching range and a means for setting a second searching range, which differs from said first searching range;

said partial image extracting unit comprises a means for extracting at least a portion of said one of said plurality of objects included in said first searching range as a first partial image and a means for extracting at least a portion of said one of said plurality of objects included in said second searching range as a second partial image; and said main subject detecting unit comprises a means for detecting whether said first partial image is said main subject and a means for detecting whether said second partial image is said main subject when said first partial image is not said main subject.

4. The image processing apparatus as claimed in claim 3, wherein said range setting unit sets a predetermined depth length as said first searching range and sets the depth length contiguous to said first searching range as said second searching range.

5. The image processing apparatus as claimed in claim 3, wherein said range setting unit sets the depth length, which includes an independent object existing at the nearest distance, as said first searching range based on said depth distribution information and sets the depth length contiguous to said first searching range as said second searching range.

6. The image processing apparatus as claimed in claim 1, wherein said range setting unit divides a depth range that includes said plurality of objects in said image data based on said depth distribution information and sets a plurality of searching ranges;

said partial image extracting unit extracts from said image data at least one of said plurality of objects included in each of said plurality of searching ranges as a plurality of partial images; and said main subject detecting unit receives a plurality of main subject information and detects said main subject from each of said plurality of partial images based on said plurality of main subject information.

7. The image processing apparatus as claimed in claim 1, wherein:

said range setting unit sets a different said searching range when said main subject is not detected in said searching range set by said range setting unit;

said partial image extracting unit extracts another partial image in said different said searching range; and said main subject detecting unit detects whether said other partial image is said main subject.

8. The image processing apparatus as claimed in claim 1, wherein said image data input unit is an image capturing unit for picking up an image of said plurality of objects, comprising:

a photographic condition setting unit for setting a photographic condition based on said main subject information; and an image capturing control unit for controlling imaging by said image capturing unit based on said photographic condition.

9. The image processing apparatus as claimed in claim 1, further comprising:

a processing condition setting unit for setting an image processing condition based on said main subject information; and an image processor for processing said image data based on said image processing condition.

10. The image processing apparatus as claimed in claim 1, further comprising:

an output condition setting unit for setting an image outputting condition based on said main subject information; and an image data output unit for outputting said image data based on said image outputting condition.

11. The image processing apparatus as claimed in claim 1, further comprising:

a selecting condition storing unit for storing a predetermined selecting condition of which said main subject should satisfy; and an image selecting unit for selecting from a plurality of said image data input by said image data input unit, a desired image data, which includes a desired main subject satisfying said selecting condition.

12. The image processing apparatus as claimed in claim 1, wherein said image data input unit is an image capturing unit, which captures an image of said plurality of objects based on a photographic timing signal, comprising:

a timing condition storing unit for storing a predetermined photographic timing condition relating to said main subject; and a timing signal output unit for outputting said photographic timing signal to said image capturing unit when said main subject satisfies said photographic timing condition.

13. The image processing apparatus as claimed in claim 1, further comprising a distance measuring unit which comprises:

a light irradiating section for irradiating light to said plurality of objects; and a calculating section for calculating a distance from said light irradiating section to said plurality of objects on the basis of the intensity of light reflected from said plurality of objects, wherein said distance measuring unit outputs a distance information to said range setting unit.

14. The image processing apparatus as claimed in claim 13, wherein said light irradiating section comprises a first light source irradiating light having a first wavelength and a second light source irradiating lights having a second and a third wavelengths, and said first and second light sources are located at an optically different positions.

15. The image processing apparatus as claimed in claim 14, wherein said first and second light sources irradiate lights at the same timing.

16. The image processing apparatus as claimed in claim 15, further comprising:
   an optically focusing section for focusing the lights irradiated by light irradiating unit and reflected from said plurality of objects;
   a beam splitting section for optically splitting said reflected light into a first light having said first wavelength, a second light having second wavelength and a third light having said third wavelength;
   a light receiving section for receiving said reflected lights split by said beam splitting section; and
   a light intensity detecting section for detecting a light intensity of said first, second and third reflected lights received by said light receiving section,
   wherein said calculating section calculates out a distance from said plurality of objects on the basis of said light intensity detected by said light intensity detecting section.

17. The image processing apparatus as claimed in claim 13, wherein said light irradiating section irradiates a light beam, further comprising:
   a light beam scanning section for scanning around a start-point said light beam toward a predetermined object within said plurality of objects; and
   a reflected light beam detecting section for detecting light beams reflected by a target of said plurality of objects, wherein said calculating section comprises an integrating section for calculating an amount of integrated intensity of said reflected light beams from said target of said plurality of objects and a distance calculating section for calculating said distance on the basis of said integrated intensity and said peak intensity of said reflected light.

18. The image processing apparatus as claimed in claim 1, further comprising a mode selecting unit for selecting an operation mode corresponding to an intended object, wherein said range setting unit restricts said searching range on the basis of said selected operation mode, and said partial image extracting unit extracts said partial image on the basis of said selected operation mode.

19. The image processing apparatus as claimed in claim 1 or 18, further comprising a display unit for displaying said partial image extracted by said partial image extracting unit and a changing section for changing a candidate of said main subject selected by said partial image extracting unit.

20. An image processing method, comprising:
   inputting image data of a plurality of objects including a main subject, said inputting image data includes inputting a parallactic image, which is generated by capturing the plurality of objects viewed from a plurality of different perspectives;
   receiving a depth distribution information calculated from said parallactic image, said depth distribution information being included in said image data and indicating a distance to each of said plurality of objects from an image data input unit;
   setting a searching range in a depth direction for searching for said main subject from the plurality of objects using the input image data;
   extracting, as a partial image, at least a portion of one of said plurality of objects from said image data based on said depth distribution information a depth direction of said partial image being restricted to said searching range; and
   receiving main subject information relating to said main subject and detecting whether said partial image is said main subject based on said main subject information, wherein
   in searching for said main subject from the plurality of objects, extracting first, as the partial image, at least a portion of said one of said plurality of objects that is closest in distance in the depth direction.

21. The image processing method as claimed in claim 20, wherein:
   said setting is a first setting of a first searching range as said searching range;
   said extracting is a first extracting, as a first partial image, of at least a portion of one of said plurality of objects included in said first searching range; and
   said detecting is a first detecting of whether said first partial image is said main subject, said detecting comprising:
   a second setting of a second searching range as said searching range when said first partial image is not said main subject;
   a second extracting, as a second partial image, of at least a portion of one of said plurality of objects included in said second searching range; and
   a second detecting of whether said second partial image is said main object.

22. The image processing method as claimed in claim 21, wherein:
   said first setting is a setting of a depth length that includes an independent object existing at the nearest distance as said first searching range based on said depth distribution information; and
   said second setting is a setting of the depth length contiguous to said first searching range, as said second searching range.

23. The image processing method as claimed in claim 20, wherein:
   said setting is a dividing a depth range that includes said plurality of objects in said image data based on said depth distribution information and a setting of a plurality of searching ranges;
   said extracting is a extracting from said image data, of at least one of said plurality of objects included in each of said plurality of searching ranges as a plurality of partial images; and
   said detecting includes receiving a plurality of main subject information relating to each of said plurality of searching ranges and detecting said main subject from each of said plurality of partial images based on said plurality of said main subject information relating to said each of said plurality searching ranges.

24. The image processing method as claimed in claim 20, wherein said inputting is an inputting at an image capturing unit, which captures an image of said plurality of objects, comprising:
   deciding a photographic condition based on said main subject information; and
   controlling an image capturing at said image capturing unit based on said photographic condition.

25. The image processing method as claimed in claim 20, further comprising:
   setting an image processing condition based on said main subject information; and
   processing said image data based on said image processing condition.

26. The image processing method as claimed in claim 20, further comprising:

setting an image outputting condition based on said main subject information;

outputting said image data based on said image outputting condition.

27. The image processing method as claimed in claim 20, further comprising:

storing a predetermined selecting condition relating to said main subject; and selecting from a plurality of said image data input at said inputting, a desired image data that includes a desired main subject satisfying said selecting condition.

28. The image processing method as claimed in claim 20, wherein said inputting is a capturing of an image of said plurality of objects based on a photographic timing signal, further comprising:

storing a predetermined photographic timing condition relating to said main subject; and outputting said photographic timing signal to said image capturing unit when said main subject satisfies said photographic timing condition.

* * * * *